(12) United States Patent
Pawley et al.

(10) Patent No.: US 6,362,847 B1
(45) Date of Patent: Mar. 26, 2002

(54) ELECTRONIC CONTROL ARRANGEMENT FOR A LASER PRINTER

(75) Inventors: Daniel Eugene Pawley, Louisville; David Anthony Schneider; Thomas Campbell Wade, both of Lexington; Earl Dawson Ward, II, Richmond, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/333,344

(22) Filed: Jun. 15, 1999

(51) Int. Cl.⁷ ............................. B41J 2/47; B41J 2/435
(52) U.S. Cl. ..................... 347/234; 347/235; 347/248; 347/250
(58) Field of Search ................... 347/234, 116, 347/235, 248, 250, 261, 249, 247, 237; 355/66, 88, 89; 359/216, 217

(56) References Cited

U.S. PATENT DOCUMENTS

| | | | |
|---|---|---|---|
| 3,703,949 A | 11/1972 | Howard et al. ........ 400/124.07 |
| 4,357,619 A | 11/1982 | Klockenbrink .............. 347/130 |
| 4,613,877 A | 9/1986 | Spencer et al. ............. 347/133 |
| 4,721,969 A | 1/1988 | Asano ........................ 347/116 |
| 4,807,156 A | 2/1989 | Parisi ........................ 358/1.2 |
| 4,816,844 A | 3/1989 | Uchida et al. .............. 347/116 |
| 4,962,981 A | * 10/1990 | Murakami et al. .......... 359/217 |
| 5,093,674 A | 3/1992 | Storlie ........................ 347/116 |
| 5,099,260 A | 3/1992 | Sato et al. .................. 347/116 |
| 5,117,243 A | 5/1992 | Swanberg et al. .......... 347/254 |
| 5,150,108 A | 9/1992 | Markham ................... 345/471 |
| 5,175,636 A | 12/1992 | Swanberg ................... 358/474 |
| 5,241,400 A | 8/1993 | Itagaki ....................... 358/401 |
| 5,517,230 A | 5/1996 | Lofthus et al. ............. 347/235 |
| 5,550,625 A | 8/1996 | Takamasu et al. .......... 399/301 |
| 5,627,579 A | 5/1997 | Fisli ........................... 347/225 |
| 5,726,760 A | 3/1998 | Luttmer ...................... 358/298 |
| 5,742,409 A | 4/1998 | Tsai et al. ................... 358/505 |
| 5,764,270 A | 6/1998 | Kitagawa et al. ........... 347/234 |
| 5,933,184 A | * 8/1999 | Ishigami et al. ............ 347/249 |
| 5,991,008 A | * 11/1999 | Li et al. ....................... 355/66 |
| 6,052,143 A | * 4/2000 | Yoshino et al. ............. 347/261 |

* cited by examiner

Primary Examiner—Hai C. Pham
(74) Attorney, Agent, or Firm—John J. McArdle, Jr.; Michael T. Sanderson; Frank C. Leach, Jr.

(57) ABSTRACT

The write lines of a color laser printer are maintained substantially equal throughout the printer's operation by an electronic control arrangement. At the factory, the write lines on all photoconductors of the color laser printer are calibrated to be substantially equal, and the ratio of each write line to a measuring line for each photoconductor is ascertained. During operation of the printer, the length of each of the measuring lines is periodically determined through counting the number of PELslice clock timing pulses produced from a PELslice clock operating at a fixed frequency determined during factory calibration. The length of the write line is determined by the product of the length of the measuring line and the factory calibrated ratio of the length of the write line to the length of the measuring line. After each periodic determination, PELslice clock timing pulses are selectively inserted into or removed from the PELslice clock timing pulses for all of the write lines but the write line, which is closest to the desired length, to increase or decrease their lengths to be substantially equal to the write line, which is closest to the desired length. The time for insertion or removal of each of the PEL slices into the train of PELslice clock timing pulses produced by the PELslice clock is determined with each preferably inserted at a non-active portion of a PEL. Each insertion or removal of a PEL slice also may be offset from its determined position.

48 Claims, 15 Drawing Sheets

ELECTRONIC CONTROL ARRANGEMENT FOR A LASER PRINTER

FIELD OF THE INVENTION

This invention relates to a laser printer and, more particularly, to an electronic control arrangement for controlling the lengths of the write lines in a laser printer.

BACKGROUND OF THE INVENTION

It is necessary for a color laser printer to have a print speed substantially the same as a non-color laser printer to have a marketable product. To accomplish this, a color laser printer can utilize four different laser scanner beams to image all four electrophotographic photoconductive drums simultaneously.

When simultaneously imaging the four electrophotographic photoconductive drums, the length of the write line for each of the four laser beams must be substantially equal. This is because the images produced on the four electrophotographic photoconductive drums must overlie each other. If the write lines are not substantially equal, then the four color images will not be in an overlying relation, and the print quality will not be satisfactory.

The primary reason for the four write lines of a color laser printer not being of equal length is the lens magnification in the laser optical systems. This is due to variations in the optical systems of the printer, especially due to thermal effects and variations in the mounting locations of the optical systems relative to the image plane on each of the electrophotographic photoconductive drums.

One previously suggested arrangement for maintaining the write lines substantially equal employed mechanical means for adjusting mirror components in the optical system of each of the four scanning laser beams. This resulted in the lengths of the four write lines being acceptably equal through changing the line magnification. However, this is a relatively expensive and complex solution to the problem.

In a non-color laser printer, it is desired for the write line of a single laser beam to be substantially the same length at all times, particularly when preprinted forms are to be completed by printing on a laser printer. Thermal effects in the laser printer can cause changes in writing line length which can affect locations of print on the preprinted forms.

U.S. Pat. No. 5,117,243 to Swanberg et al discloses the use of PEL slices produced by a clock to control non-linear velocity sweep of a single laser beam along a scan line. U.S. Pat. No. 5,175,636 to Swanberg employs two different clock frequencies to correct for non-linear velocity sweep of a single laser beam along a scan line. However, neither of the aforesaid Swanberg et al and Swanberg patents suggests any correction for lens magnification during operation.

SUMMARY OF THE INVENTION

The electronic control arrangement of the present invention satisfactorily solves the foregoing problem of maintaining the lengths of the write lines of a plurality of laser beams of a color laser printer substantially equal. Additionally, this electronic control arrangement also can be utilized in a non-color laser printer to maintain the write lines of one or more laser beams substantially constant.

The electronic control arrangement measures the length of each of the write lines of the laser beams. These measurements are used to adjust the lengths of the write lines so that they are substantially equal.

The differences in the lengths of the write lines of the plurality of laser beams are due to each of the laser beams scanning the electrophotographic photoconductive drum at a different average velocity. That is, the time is the same for each laser beam to write a line of a fixed number of individual print elements (PELs) or dots by scanning one of the electrophotographic photoconductive drums. However, different average velocities of the laser beams in scanning the electrophotographic photoconductive drums to produce the write lines on their surfaces result in the laser beams moving different distances during the same time period to form the write lines.

Each write line scanned by a laser beam is divided into dots or PELs. To discharge an electrophotographic photoconductive drum at desired dot locations, the laser diode is turned on. When no dot is to be printed, the laser diode is turned off. To control the amount of energy delivered to the electrophotographic photoconductive drum to create this latent image, prior art controls the amount of time that the laser beam is turned on and the intensity with which the laser beam is turned on (via the amount of current passed through the laser diode).

To facilitate finer control of the energy delivered to discharge an individual PEL location on the electrophotographic photoconductive drum and of the location of the dot, each of the PELs can be subdivided further into slices, referred to as PEL slices. If, for example, the PEL is divided into eight slices, then turning the laser on for four slices delivers energy over ½ (⁴⁄₈) of the time that the laser beam travels the distance of one PEL (¹⁄₆₀₀ of an inch or 600 dots per inch) on the electrophotographic photoconductive drum surface. In the preferred embodiment, the PEL is energized at the start of the PEL window, which includes all of the PEL slices comprising the PEL. However, it is not necessary for energization to be at the start of the PEL window.

In addition to ascertaining the average velocity of the laser beam across the electrophotographic photoconductive drum, one embodiment of the electronic control arrangement of the present invention selectively adds PEL slices to the clock timing pulses of a single fixed clock frequency employed for controlling the timing of laser beam energization and for counting the number of PEL slices between the start of scan (SOS) optical sensor and the end of scan (EOS) optical sensor for each of the laser beams. The distance between the SOS sensor and the EOS sensor is a predetermined distance constituting a measuring line. The electronic control arrangement controls when the PEL slices are added so that they are typically added at the end of the PEL where the laser beam is normally off.

In another embodiment, PEL slices may be either added or removed from the clock timing pulses to change the number of the clock timing pulses in a PEL. During factory calibration, a determination is made as to whether the PEL slices will be added or removed during the life of the printer.

The insertion or removal of PEL slices at the same location on each write line may create columns or bands. These columns or bands may be visible on the printed medium depending on the print pattern.

To avoid this possibility, the present invention contemplates offsetting the locations of the insertion or removal of the PEL slices on adjacent write lines. One example would have a constant offset with adjacent write lines having the start of the insertion or removal begin at different PELs. Another example would have different offset values for adjacent write lines.

The invention also contemplates changing the locations on a single write line of insertion or removal of PEL slices so that they are not equal.

An object of this invention is to provide substantially equal lengths of laser beam write lines on each of a plurality of photoconductor surfaces.

Another object of this invention is to control the length of a write line on a photoconductor of a laser printer to maintain it substantially the same length at all times.

A further object of this invention is to add or remove PEL slices at selected locations in write lines.

Still another object of this invention is to selectively offset the locations at which PEL slices are added or removed from adjacent write lines.

Other objects of this invention will be readily perceived from the following description, claims, and drawings.

BRIEF DESCRIPTION OF THE DRAWINGS

The attached drawings illustrate preferred embodiments of the invention, in which.

DETAILED DESCRIPTION OF PREFERRED EMBODIMENTS

Figure 1:
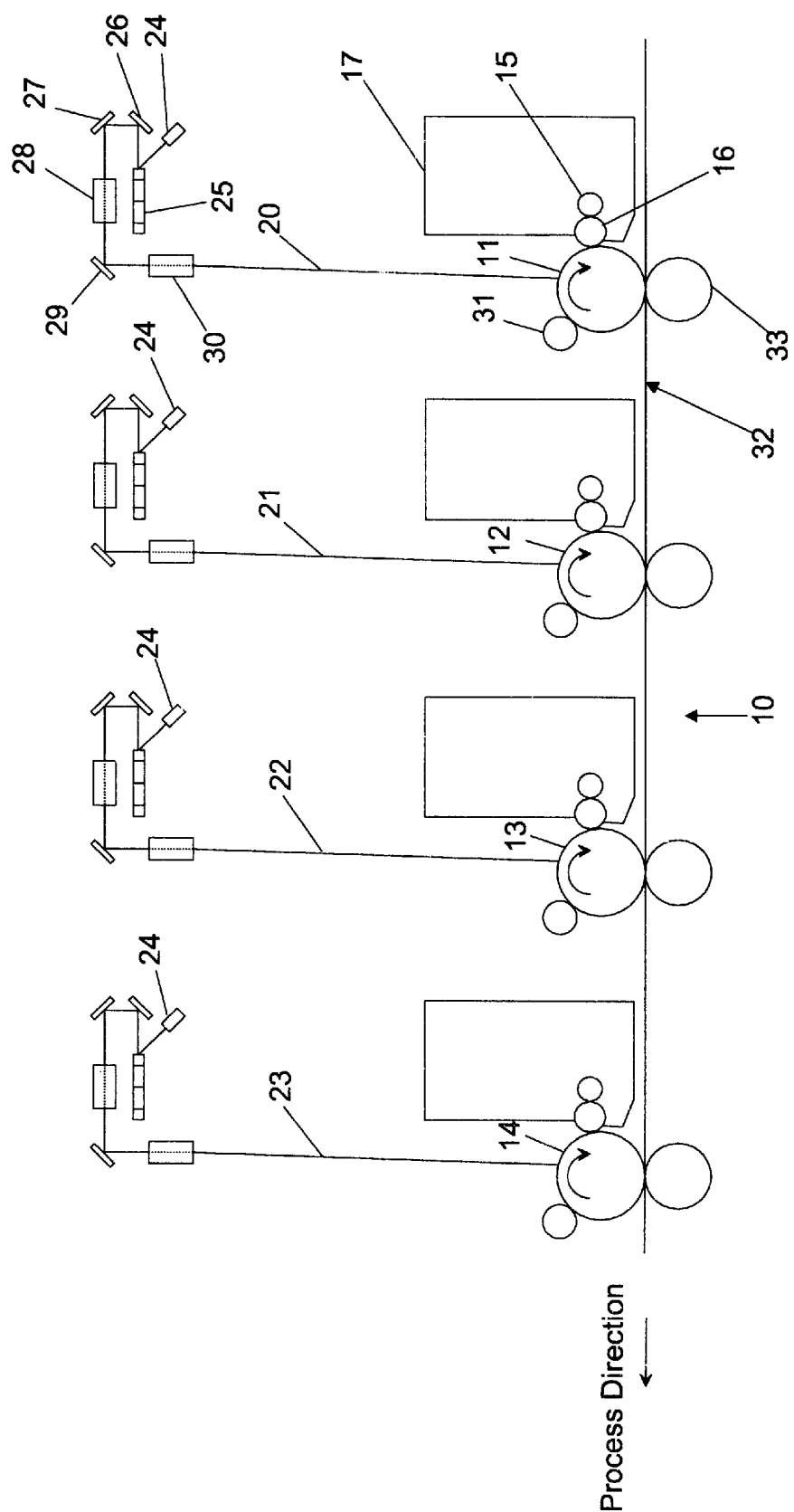
FIG. 1 is a schematic diagram of a portion of a color laser printer utilizing the electronic control arrangement of the present invention.

Referring to the drawings and particularly FIG. 1, there is shown a portion of a color laser printer 10 having four electrophotographic photoconductive drums 11, 12, 13, and 14. Each of the electrophotographic photoconductive drums 11, 12, 13, and 14 has toner transferred to it through a toner adder roll 15 and a developer roll 16.

Each of the toner adder rolls 15 receives a toner of a specific color from a toner housing 17. The colors of the toners for the four electrophotographic photoconductive drums 11, 12, 13, and 14 are yellow, cyan, magenta, and black, respectively.

Each of the electrophotographic photoconductive drums 11, 12, 13, and 14, respectively, is scanned by laser beams 20, 21, 22, and 23, respectively. The laser beam 20 is produced from a laser collimator 24, which includes a laser, striking a rotating polygonal mirror 25 from which the reflected laser beam 20 is directed by two fold mirrors 26 and 27 to pass through a first f-theta lens 28, a fold mirror 29, and a second f-theta lens 30. Each of the other laser beams 21, 22, and 23 is similarly produced by another of the laser collimators 24.

Each of the electrophotographic photoconductive drums 11, 12, 13, and 14 has a charge roll 31 to charge it. A latent image is produced on each of the electrophotographic photoconductive drums 11, 12, 13, and 14 due to modulation of the laser beams 20, 21, 22, and 23, respectively, which discharge the electrophotographic photoconductive drums 11, 12, 13, and 14, respectively, at those locations.

An image is then transferred to a-first transfer-medium (FTM) 32, which may be an endless driven belt or a sheet of medium such as paper, for example, advanced by an endless belt. In either case, the FTM 32 passes between the electrophotographic photoconductive drum 11 and a transfer roll 33, which has a sufficient charge to pull the yellow image from the electrophotographic photoconductive drum 11 to transfer the yellow image to the FTM 32. In sequence, the cyan, magenta, and black images from the electrophotographic photoconductive drums 12, 13, and 14, respectively, are applied to the same portion of the FTM 32 to overlie the prior color or colors on the FTM 32. After passing the electrophotographic photoconductive drum 14, the image on the FTM 32, if it is not a sheet of medium advanced by an endless belt, is transferred to a sheet of medium such as paper, for example, and fixed thereon.

The laser beams 20, 21, 22, and 23 begin scanning a new line across the electrophotographic photoconductive drums 11, 12, 13, and 14, respectively, each time a new facet on the respective rotating polygonal mirrors 25 intercepts the respective laser beam path from its respective collimator 24. The motor for each of the rotating polygonal mirrors 25 is controlled from the same clock frequency so that all rotate at essentially the same average velocity. Each of the rotating polygonal mirrors 25 has the same number of facets (eight in the preferred embodiment but not limited to that number). Accordingly, each of the laser beams 20, 21, 22, and 23 has equal rates of scans/second and, thus, equal times for a scan.

This scan rate is based on the resolution in the cross-scan direction (scans/inch) at the electrophotographic photoconductive drum multiplied by the surface velocity of the electrophotographic photoconductive drum (inches/second). The rotational velocity of each of the rotating polygonal mirrors 25 is determined by this scan rate divided by the number of facets on the rotating polygonal mirror 25. Therefore, this scan rate also can be expressed as the velocity of the motor of the rotating polygonal mirror 25 multiplied by the number of facets on the rotating polygonal mirror 25.

The printer 10 has a separate Start of Scan (SOS) optical sensor 34 (see FIG. 2) for each of the four laser beams 20 (see FIG. 1), 21, 22, and 23. The printer 10 has a separate End of Scan (EOS) optical sensor 35 (see FIG. 2) for each of the four laser beams 20 (see FIG. 1), 21, 22, and 23.

Figure 2:
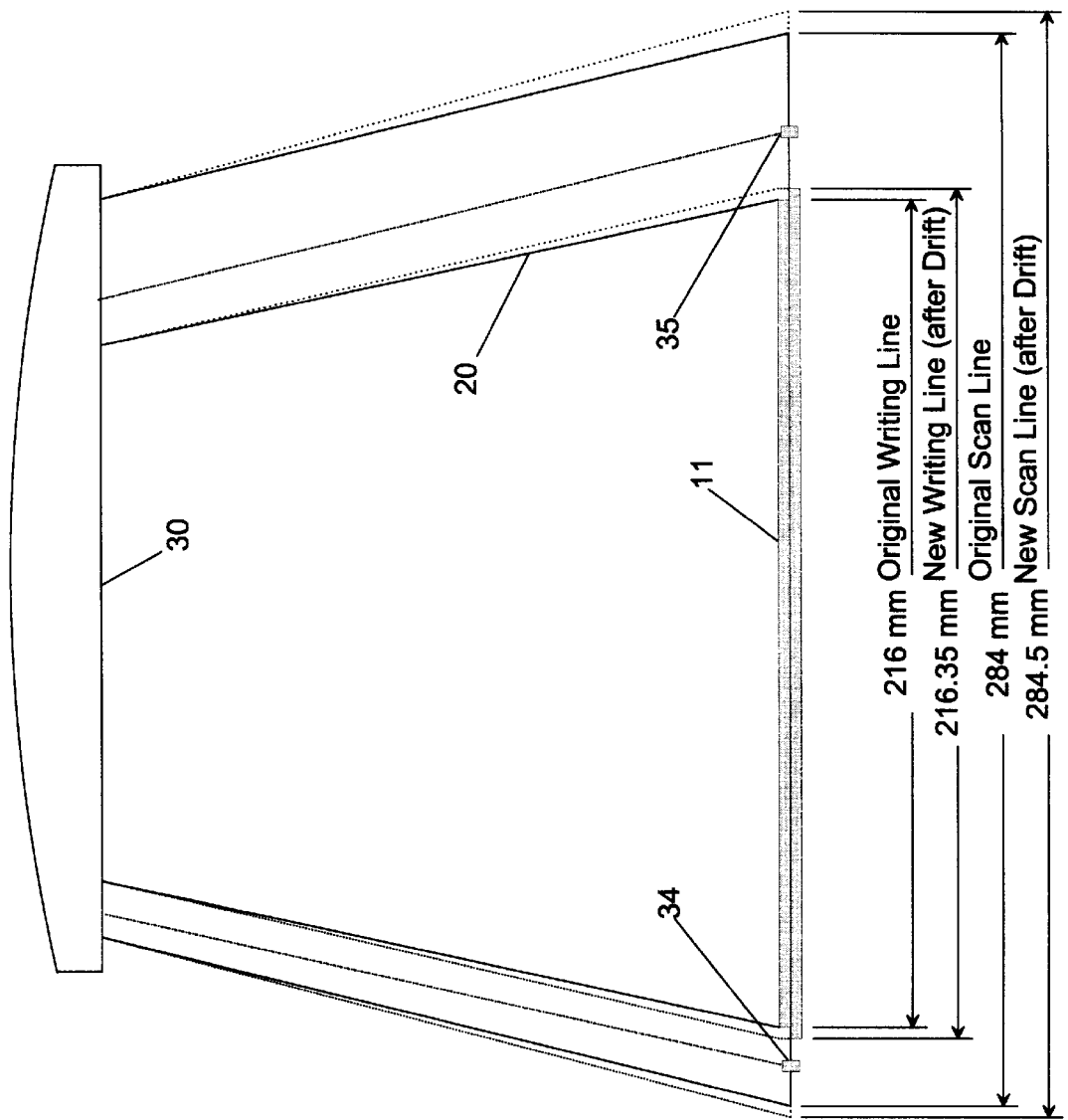
FIG. 2 is a schematic diagram showing the write line and the scan line on one of a plurality of electrophotographic photoconductive drums of the color laser printer of FIG. 1 with the original write and scan lines being solid and the write and scan lines after drift due to line magnification being dotted.

Each of the laser beams 20, 21, 22, and 23 is sensed by one of the SOS optical sensors 34 (see FIG. 2) and one of the EOS optical sensors 35 during its scan over one of the four electrophotographic photoconductive drums 11, 12 (see FIG. 1), 13, and 14, respectively. The optical sensors 34 (see FIG. 2) and 35 are located outside of the write line and at approximately the same distance from the second f-theta lens 30 for each of the laser beams 20 (see FIG. 1), 21, 22, and 23 as each of the four electrophotographic photoconductive drums 11, 12, 13, and 14, respectively. This relation is shown in FIG. 2 for the laser beam 20 and the electrophotographic photoconductive drum 11.

The distance between the SOS optical sensor 34 (see FIG. 2) and the EOS sensor 35 is a predetermined length and constitutes a measuring line. Due to tolerances, the predetermined length between the SOS optical sensor 34 and the EOS optical sensor 35 may vary slightly for the four sets of the optical sensors 34 and 35 of the printer 10 (see FIG. 1).

Figure 5:
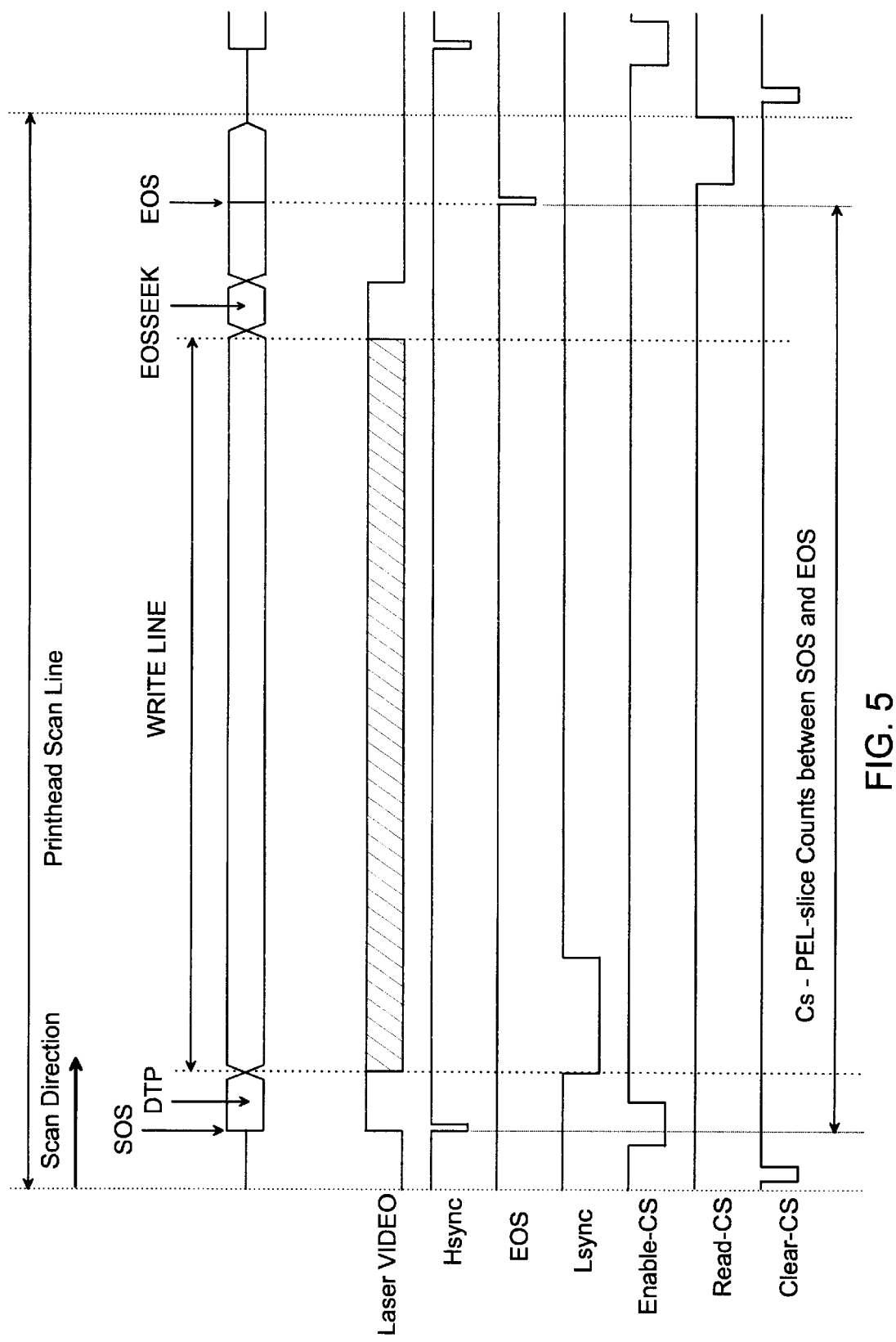
FIG. 5 is a timing diagram showing the relationship of various pulses with respect to the write and scan lines on one of the electrophotographic photoconductive drums of the color laser printer of FIG. 1.

As shown in FIG. 5, a horizontal synchronization (Hsync) signal goes low when the SOS optical sensor 34 (see FIG. 2) senses the laser beam 20, for example. When the Hsync signal goes low as shown in FIG. 5, a delay-to-print time (DTP) begins.

The DTP time for each of the four laser beams 20 (see FIG. 1), 21, 22, and 23 may be different for each beam to shift the start of writing location for each of the four laser beams 20 (see FIG. 1), 21, 22, and 23 to correct for system variations in the scan direction. The value of the time of each of the DTP (see FIG. 5) is calibrated at the factory so that modulation of each of the laser beams 20 (see FIG. 1), 21, 22, and 23 may begin at a different time but in each case the write line begins at the end of the DTP time for the specific laser beam.

When the DTP time is completed, a low line synchronization (Lsync) pulse is produced to start modulation of the laser beam 20 (see FIG. 1), 21, 22, or 23 as indicated by a VIDEO signal from one of VIDEO circuits 36 (see FIG. 8), 37, 38, and 39, respectively, varying between high and low in FIG. 5. The VIDEO circuits 36 (see FIG. 8), 37, 38, and 39 receive PHXTL-OUT clock timing pulses from Insertion circuits 40, 41, 42, and 43, respectively. As shown in FIG. 5, the Lsync signal goes high after a predetermined period of time but the modulation of the laser beam 20 (see FIG. 1), 21, 22, or 23 continues until the total time for the write line expires as shown in FIG. 5.

There is a writing time (determined by the scan time and the scan efficiency) between starting and ending of the write line on each of the four electrophotographic photoconductive drums 11 (see FIG. 1), 12, 13, and 14. With the desired average velocity of the laser beam along the electrophotographic photoconductive drum, this would produce a write line having a length of approximately 215.9 mm. However, the desired average velocity for each of the four electrophotographic photoconductive drums 11, 12, 13, and 14 is not always obtained at the factory or it changes during operation of the printer 10 due to heating in the printer 10 causing a change in line magnification.

When the laser beam 20 is sensed by the EOS optical sensor 35 (see FIG. 2), a low EOS pulse (see FIG. 5) is produced. The scan continues until the fixed time for scanning ends.

With a resolution of 600 dots per inch (dpi) and a writing line length of 215.9 mm (8.5 inches), the number of individual print elements (PELs) or dots across the entire write line would be 5,100 PELs. The entire write line of 8.5" is the width of the sheet of medium.

With eight slices per PEL, 40,800 slices are produced for each write line. It should be understood that the number of slices per PEL may be other than eight and the write line may be other than 8.5".

When power is initially applied to the printer 10 (see FIG. 1), a reset circuit generates a low POR (Power-On-Reset) pulse (see FIG. 4) for a predetermined period of time. This predetermined period of time is sufficient to guarantee that a Bit-Clk counter 45 (see FIG. 3), an Insert-Freq counter 46, and D-type flip flops 47 and 48 are initialized to their desired states. The counters 45 and 46 are preferably 74 LS 161 type counters although each may be embedded in a custom ASIC (application specific integrated circuit) device. After the predetermined period of time ends, the POR signal goes high, as shown in FIG. 4, and remains in this state as long as the printer 10 (see FIG. 1) is powered up.

Figure 3:
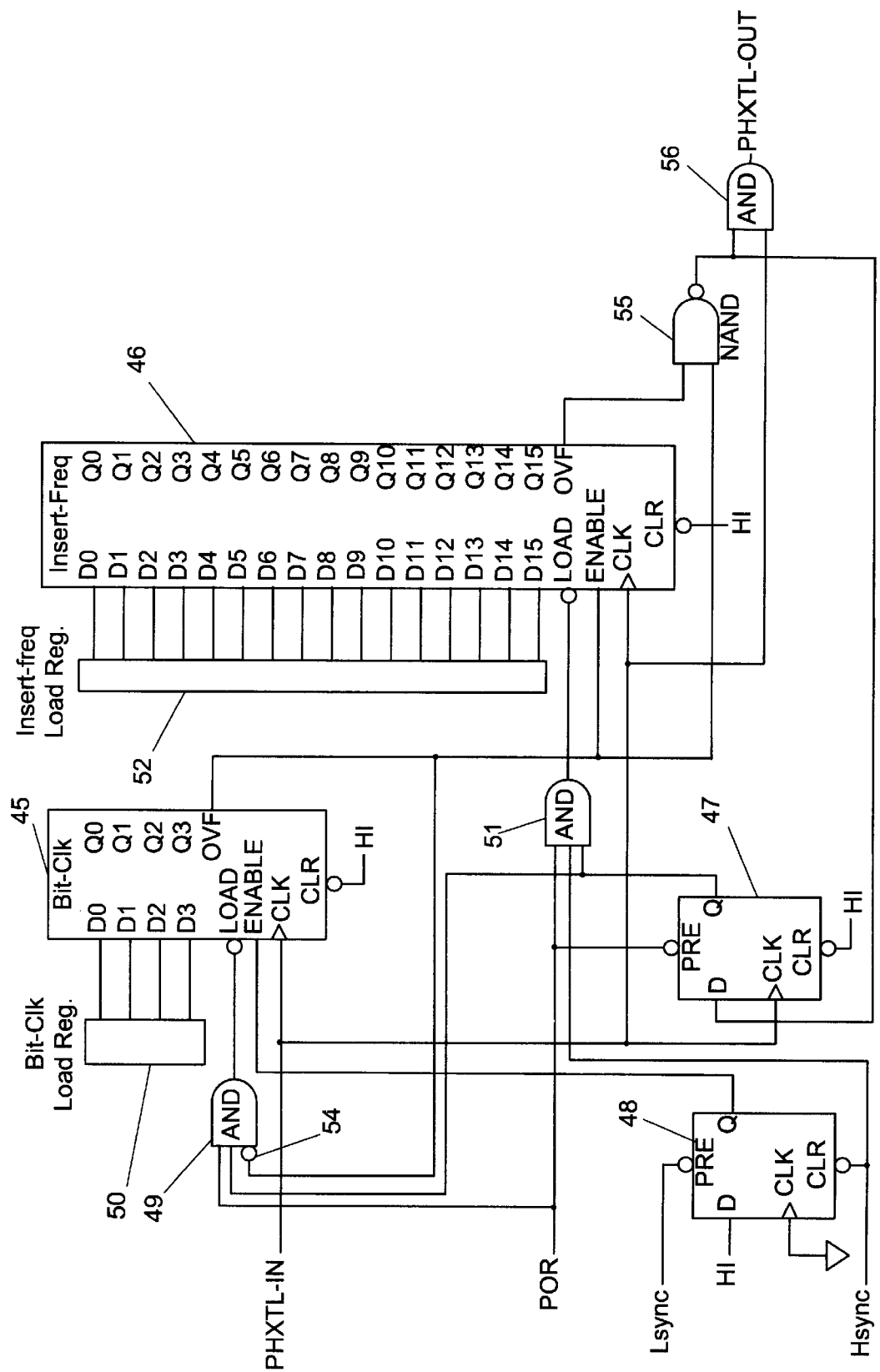
FIG. 3 is a block diagram of a logic circuit of the electronic control arrangement of the present invention in which lengths of write lines are controlled by adding PEL slices with a separate circuit being used with each of the electrophotographic photoconductive drums.
Figure 4:
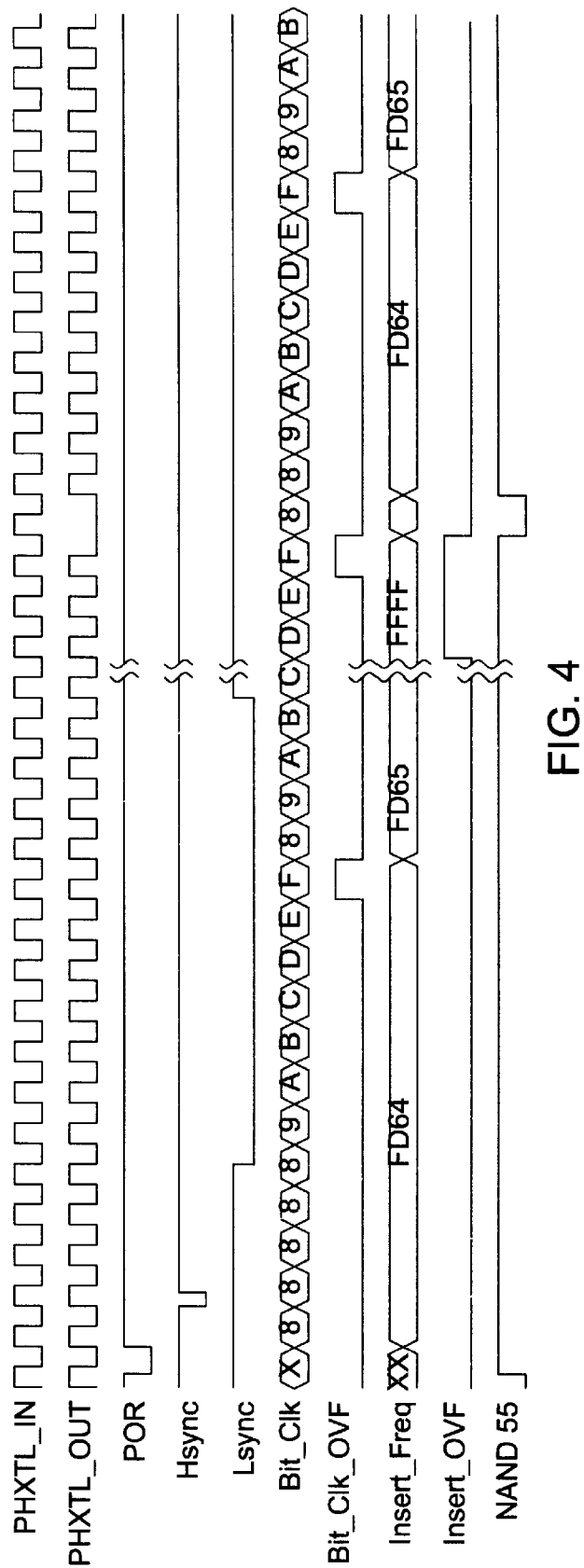
FIG. 4 is a timing diagram of various pulses occurring in the circuit of FIG. 3.

As shown in FIG. 3, the low POR pulse is applied through an AND gate 49 to a LOAD input of the counter 45. When the LOAD input of the counter 45 receives an active low synchronous input from the output of the AND gate 49 due to the low POR pulse, data from a Bit-Clk load register 50 is supplied to the counter 45. A typical loading of the counter 45 is indicated in FIG. 4 at Bit-Clk.

The low POR pulse also is supplied to an AND gate 51 (see FIG. 3). The output of the AND gate 51 transmits a logic low to a LOAD input of the counter 46 to load the count in the counter 46 from an Insert-Freq load register 52. The counts in the registers 50 and 52 are determined by factory calibrations at the time of manufacture as will be explained hereinafter.

Each of the counters 45 and 46 has a CLR input, which resets the count in the counter 45 or 46 to zero when it receives an active low asynchronous input. Because each of the counters 45 and 46 is preloaded with an initial value from the registers 50 and 52, respectively, the CLR input of each of the counters 45 and 46 is connected to a logic high so that it is never utilized.

With the counter 45 being a four bit counter and there being eight slices per PEL, the counter 45 has a range of 0 to FHex and is loaded with a value that is the 2's complement of the number of slices in a PEL. For the preferred embodiment, a value of 8 Hex is loaded from the register 50.

With the counter 46 being a sixteen bit counter, the counter 46 has a range of 0000 to FFFFHex and is loaded with the 2's complement of the number of PELs between inserts of a PEL slice. As an example, if, at factory calibration, it was determined that a PEL slice should be inserted every 668 PELs, then a value of FD64 Hex would be loaded from the register 52.

The POR signal also is supplied to a PRE input of the flip flop 47. When the POR signal goes low, the output Q of the flip flop 47 is set at a logic high.

A PELslice clock 53 (see FIG. 8) generates PHXTL-IN clock timing pulses at a factory calibrated fixed frequency. These PHXTL-IN clock timing pulses are shown in FIG. 4.

The PHXTL-IN clock timing pulses are supplied from the PELslice clock 53 (see FIG. 8) to a CLK input of the counter 45 (see FIG. 3) and a CLK input of the counter 46. Each time that the PHXTL-IN clock timing pulse goes high, its positive edge increments the count in each of the counters 45 and 46 by one provided that an ENABLE input of each of the counters 45 and 46 is receiving an active high when its CLK input receives the positive edge of the PHXTL-IN clock timing pulse. If the ENABLE input of either of the counters 45 and 46 is not receiving a high input, then its count will not be incremented by the positive edge of the PHXTL-IN clock timing pulse.

Each of the counters 45 and 46 has an OVF output. This provides a logic high output for one clock timing pulse input when the counter 45 or 46 increments to 0.

Each time that the OVF output of the counter 45 goes high, it is supplied to the ENABLE input of the counter 46 to increment its count when the next PHXTL-IN clock timing pulse goes up. Thus, each time that the count in the counter 45 is at its maximum of eight, the count in the counter 46 increases by one. This is shown in FIG. 4 by each high pulse on the OVF output of the Bit-Clk counter 45 increasing the count in the Insert-Freq counter 46 by one.

Each time that the OVF output of the counter 45 (see FIG. 3) goes high due to the counter 45 reaching its maximum count of eight, the high OVF output of the counter 45 is supplied through an inverter 54 to the AND gate 49 whereby the LOAD input of the counter 45 receives the active low synchronous input from the AND gate 49 to load the counter 45 again from the register 50.

The OVF output of the counter 45 also is one of two inputs to a NAND gate 55. The other input to the NAND gate 55 is the OVF output of the counter 46.

The output of the NAND gate 55 is high unless both of its inputs are high. Accordingly, except when the count in the counter 46 is at an overflow condition causing the OVF output to go high, the high from the NAND gate 55 enables the PHXTL-IN clock timing pulses to be supplied from an AND gate 56 as PHXTL-OUT clock timing pulses. Thus, as shown in FIG. 4, the PHXTL-OUT clock timing pulses track the PHXTL-IN clock timing pulses as long as the OVF output of the counter 46 (see FIG. 3) is not high.

Therefore, only when the OVF output of the counter 46 goes high is there a low output from the NAND gate 55 since the OVF output of the counter 45 is always high when the OVF output of the counter 46 is high. When this occurs, there is no PHXTL-OUT clock timing pulse from the output of the AND gate 56 for one count because the output of the NAND gate 55 remains low as shown in FIG. 4. This low output from the AND gate 56 (see FIG. 3) stretches the clock pulse for the current PEL slice to a length of two clock cycles as shown in FIG. 9 to effectively insert an additional PEL slice for each of the laser beams 20 (see FIG. 8), 21, 22, or 23 with which the circuit of FIG. 3 is utilized. That is, there is one of the circuits of FIG. 3 as part of the Insertion circuits 40 (see FIG. 8), 41, 42, and 43 for the four laser beams 20, 21, 22, and 23, respectively.

Since each of the VIDEO circuits 36 37, 38, and 39 utilizes the PHXTL-OUT signal as its clock timing base, the clock stretching at each of the insertion circuits 40, 41, 42, and 43, respectively, causes the output of the synchronous logic within the VIDEO circuits 36, 37, 38, and 39 to remain in a static state. This includes the output of each of the VIDEO circuits 36, 37, 38, and 39, which control the corresponding laser beams 20, 21, 22, and 23, respectively.

When the output from the NAND gate 55 (see FIG. 3) goes low, a low signal is latched at the D input of the flip flop 47. This causes the Q output of the flip flop 47 to go low on the positive edge of the next PHXTL-IN clock timing pulse at CLK input of the flip flop 47 whereby the output of the AND gate 51 goes low. This low output from the AND gate 51 results in the LOAD input of the counter 46 receiving an active low synchronous input to cause the data to be loaded into the counter 46 from the register 52.

When the OVF output of the counter 46 goes high, the OVF output of the counter 45 also goes high at that time. Accordingly, both of the counters 45 and 46 are reloaded at the same time. Of course, the counter 45 is reloaded many more times than the counter 46.

The flip flop 48 has its Q output connected to the ENABLE input of the counter 45. The flip flop 48 has its D input always high.

When the Hsync signal goes low due to the SOS sensor 34 (see FIG. 2) sensing the corresponding laser beam 20 (see FIG. 8), 21, 22, or 23 with which the circuit of FIG. 3 is utilized, the flip flop 48 receives a logic low at its CLR input. This results in its Q output going to zero since the Lsync signal, which is supplied to the PRE input of the flip flop 48, is high when the Hsync signal goes low as shown in FIG. 5.

The Lsync signal goes low when it is desired to write through changing the VIDEO output signal of each of the VIDEO circuits 36 (see FIG. 8), 37, 38, and 39 between logic high and low values as the laser beam 20, 21, 22, or 23, respectively, is modulated. At this time, the Hsync signal (see FIG. 5) has already gone high. Therefore, the low Lsync signal at the PRE input of the flip flop 48 (see FIG. 3) sets its Q output to logic high.

As previously mentioned, the Q output of the flip flop 48 is connected to the ENABLE input of the counter 45. This allows the counter 45 to increment by a count of one when it receives the positive edge of the next PHXTL-IN clock timing pulse. Accordingly, the Q output of the flip flop 48 remains high until the next Hsync signal is received at the start of the next scan at the CLR input of the flip flop 48.

Figure 7:
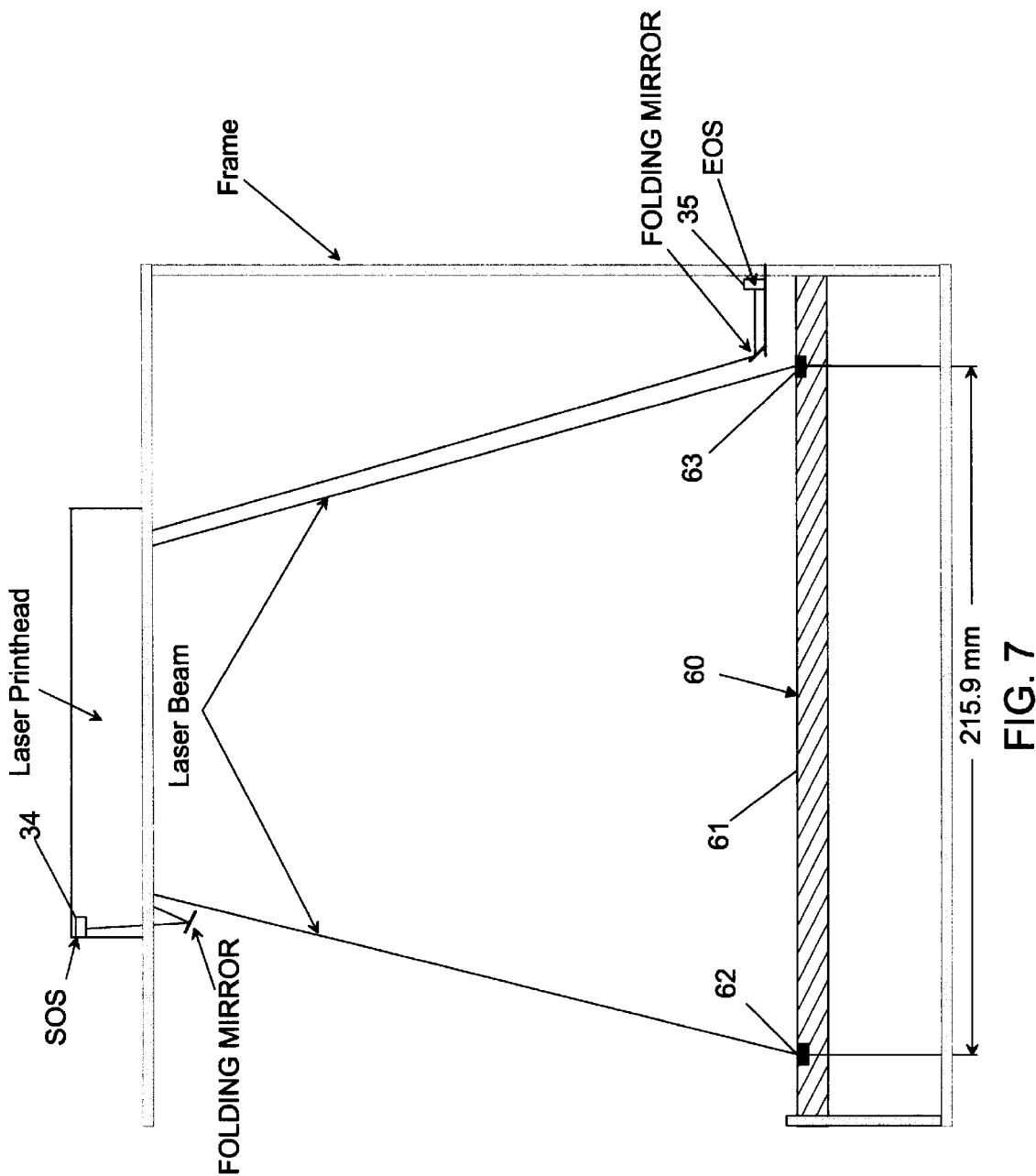
FIG. 7 is a schematic diagram showing a fixture having optical sensors, which define a gage or measuring distance between the optical sensors equal to the desired write line distance and used for calibration in place of each of the electrophotographic photoconductive drums.

During factory calibration, the printer 10 (see FIG. !has a separate fixture 60 (see FIG. 7) for each of the laser beams 20 (see FIG. 1), 21, 22, and 23. Each of the fixtures 60 (see FIG. 7) has a surface 61 located in the printer 10 (see FIG. 1) at the same level as would be occupied by each of the electrophotographic photoconductive drums 11, 12, 13, and 14 during normal printer operations. Each of the fixtures 60 (see FIG. 7) is employed to adjust one of the four laser beams 20 (see FIG. 1), 21, 22, and 23 for skew and offset so that all four of the laser beams 20, 21, 22, and 23 impinge on the electrophotographic photoconductive drums 11, 12, 13, and 14, respectively, at the correct location to result in parallel images on the print medium.

The surface 61 (see FIG. 7) of each of the fixtures 60 has two optical sensors 62 and 63 positioned thereon at a fixed distance, Xg, from each other and less than the effective distance swept across each of the electrophotographic photoconductive drums 11 (see FIG. 1), 12, 13, and 14 between the optical sensors 34 (see FIG. 2) and 35. Xg is 215.9 mm±20 microns and is the desired length of the write line. The exact distance, Xg, between the two optical sensors 62 (see FIG. 7) and 63 on each of the fixtures 60 is determined by using a calibration procedure.

Because of manufacturing tolerances, the exact distance, Xg, between the two optical sensors 62 and 63 on each of the fixtures 60 will be slightly different. Thus, it is necessary to determine these different distances for Xg and correct the lengths of the write lines of the laser beams 20 (see FIG. 1), 21, 22, and 23 to be substantially equal to each other and substantially equal to the desired distance of 215.9 mm.

In Table 1, the actual values of Xg, Xs, Li, and Vi set forth are assumed to provide an example. No tests have been run but these assumed values show how factory calibration is made.

Xs is the distance between the optical sensors 34 (see FIG. 2) and 35. Li identifies the initial length of the write line of each of the laser beams 20 (see FIG. 1), 21, 22, and 23.

The initial average velocity, Vi, of each of the laser beams 20, 21, 22, and 23 is in mm/sec. This is determined by the time that it takes for one of the laser beams 20, 21, 22, and 23 to move between the two optical sensors 62 (see FIG. 7) and 63 on the corresponding fixture 60.

In each of Tables 1–4, C20 identifies the write line of the laser beam 20 (see FIG. 1) on the electrophotographic photoconductive drum 11, C21 identifies the write line of the laser beam 21 on the electrophotographic photoconductive drum 12, C22 identifies the write line of the laser beam 22 on the electrophotographic photoconductive drum 13, and C23 identifies the write line of the laser beam 23 on the electrophotographic photoconductive drum 14.

The line length, L1, of the write line is then calculated for each of the laser beams 20, 21, 22, and 23 by using the average velocity V1, determined by equation (1), for each of the laser beams 20, 21, 22, and 23 in the following equation:

$$L1 = V1 \times \text{Write Time} \tag{2}$$

Since all four of the write lines C20, C21, C22, and C23 of Table 1 for the four laser beams 20, 21, 22, and 23, respectively, have the same writing time, the length, L1, of the longest of the four write lines C20, C21, C22, and C23 will be the write line having the highest velocity. From the data in Table 1, C20 has the longest length of the four write lines C20, C21, C22, and C23.

The next step is to adjust the frequency of the PELslice clock 53 (see FIG. 8) so that the length of the longest of the four write lines C20, C21, C22, and C23 is approximately 215.9 mm. Then, it is necessary to adjust the other write lines to the length of C20 at the new fixed frequency of the PELslice clock 53.

Accordingly, a new selected fixed frequency, f1, of the PELslice clock 53 is calculated from the initial measurements as follows:

$$f1 = (40{,}800 \text{ counts/line} \times V1)/215.9 \tag{3}$$

or $$f1 = (Li/215.9) fi \tag{4}$$

where fi is the initial fixed frequency of the PELslice clock 53.

Li is the length of the write line C20 in this example.

TABLE 1

| Line | Actual | | | | Measured | | | Calculate | |
|---|---|---|---|---|---|---|---|---|---|
| | Xg | Xs | Li | Vi | Cg1 | Cs1 | V1 | L1 | Li-L1 |
| C20 | 215.920 | 233.011 | 216.600 | 382692 | 40667 | 43890 | 382703 | 216.606 | −0.006 |
| C21 | 215.910 | 232.130 | 216.250 | 382074 | 40733 | 43795 | 382083 | 216.255 | −0.005 |
| C22 | 215.880 | 232.610 | 215.200 | 382018 | 40932 | 44100 | 380225 | 215.204 | −0.004 |
| C23 | 215.890 | 231.612 | 215.550 | 380837 | 40866 | 43840 | 380839 | 215.551 | −0.001 |
| Max mm | 215.920 | 233.011 | 216.600 | 382692 | | | | | |
| Min mm | 215.880 | 231.612 | 215.200 | 380218 | | | | | |
| Diff mm | 0.040 | 1.399 | 1.400 | 2474 | | | | | |

In Table 1, Cg1 represents the number of PELslice counts, at the frequency of the PELslice clock 53 (see FIG. 8), measured between the two optical sensors 62 (see FIG. 7) and 63 on the related fixture 60 at the factory calibration. Cs1 represents the number of PELslice counts at the frequency of the PELslice clock 53 (see FIG. 8) measured between the optical sensors 34 (see FIG. 2) and 35 at the factory calibration.

V1 is the average velocity in mm/sec of each of the laser beams 20 (see FIG. 1), 21, 22, and 23 as it travels between the two optical sensors 62 (see FIG. 7) and 63 on one of the fixtures 60 for each of the laser beams 20 (see FIG. 1), 21, 22, and 23.

For each of the laser beams 20, 21, 22, and 23, V1 is calculated using the following equation:

$$V1 = Xg/(Cg1 \times Ti) \text{ mm/sec} \tag{1}$$

where Ti is the initial time period for a PELslice clock timing pulse or count and is equal to 13.87 nanoseconds in this example.

Therefore, T1 (the new PEL slice time period for the write line C20 in this example) is $$T1 = 1/f1 \tag{5}$$

Wt1 is the write time for 40,800 PEL slices per write line. Thus, $$Wt1 = 40{,}800 \times T1 \tag{6}$$

Equations (4)–(6) produce the following calculated values: f1=72.32 MHz, T1=13.83 nanoseconds, and Wt1=564.16 microseconds.

Xg, Xs, and V1 remain constant as the frequency of the PELslice clock 53 (see FIG. 8) changes because they are independent from the PEL slice timing. With the frequency of the PELslice clock 53 now being f1 (the new selected fixed frequency), the number of counts measured between the optical sensors 62 (see FIG. 7) and 63 in the fixture 60 is Cg2. Likewise, the number of the PELslice clock timing pulses at frequency fl measured between the optical sensors 34 (see FIG. 2) and 35 is Cs2.

Figure 6:
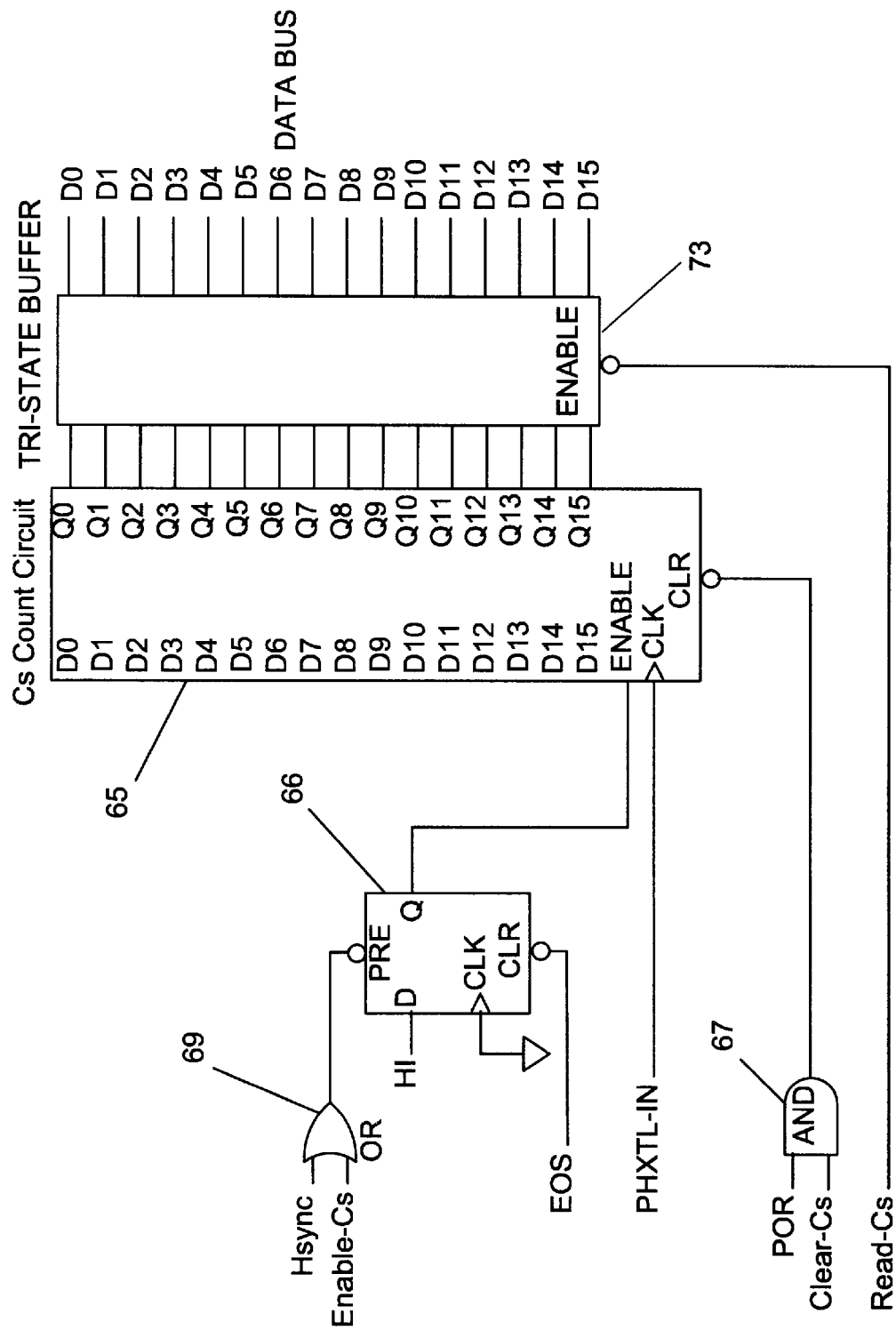
FIG. 6 is a block diagram of a logic circuit of the electronic control arrangement of the present invention for counting the number of clock timing pulses between the start and end of a scan on one of the electrophotographic photoconductive drums by a laser beam with a separate circuit being used with each of the electrophotographic photoconductive drums.

A CS counter 65 (see FIG. 6), which is preferably a 74 LS 161 type counter although it could be implemented in a custom ASIC module, counts the number of PELslice clock timing pulses, PHXTL-IN, as one of the laser beams 20 (see FIG. 1), 21, 22, and 23 moves from the optical sensor 34 (see FIG. 2) to the optical sensor 35. There is a separate one of the counters 65 (see FIG. 6) for each of the laser beams 20 (see FIG. 1), 21, 22, and 23. Thus, one of the counters 65 (see FIG. 6) is in each of the Insertion circuits 40 (see FIG. 8), 41, 42, and 43.

The counter 65 (see FIG. 6) has its ENABLE input connected to Q output of a D-type flip flop 66. When the printer 10 (see FIG. 1) is turned on, the POR signal goes low, as shown in FIG. 4, to supply a low pulse through an AND gate 67 (see FIG. 6) to a CLR input of the counter 65. This low output from the AND gate 67 resets the counter 65 to zero.

Thus, after the POR signal returns to its high level, the AND gate 67 goes high. Then, when the Hsync signal goes low while the Enable-CS signal is low, the Q output of the flip flop 66 goes high to enable the CS counter 65 to start counting. Each of the PHXTL-IN clock timing pulses to CLK input of the counter 65 is counted on its positive edge as long as the ENABLE input of the counter 65 is high.

A microprocessor 68 (see FIG. 8) causes an Enable-CS signal to go low as shown in FIG. 5 prior to the OR gate 69 (see FIG. 6) receiving the low Hsync signal. When the laser beam 20 (see FIG. 1), 21, 22, or 23 is sensed by the SOS optical sensor 34 (see FIG. 2), an Hsync signal goes low as shown in FIG. 5.

Accordingly, with two low signals being supplied to the OR gate 69 (see FIG. 6), its output supplies a logic low to PRE input of the flip flop 66. This latches the Q output of the flip flop 66 in a high state so that the counter 65 begins to count the PHXTL-IN clock timing pulses at the same time that the SOS optical sensor 34 (see FIG. 2) senses the presence of the laser beam 20 (see FIG. 1), 21, 22, or 23. The Q output of the flip flop 66 (see FIG. 6) will remain high until it receives a low on the CLR input.

When the EOS optical sensor 35 (see FIG. 2) senses the presence of the laser beam 20 (see FIG. 1), 21, 22, or 23, an EOS signal goes low as shown in FIG. 5. This causes the CLR input of the flip flop 66 (see FIG. 6) to go low. As a result, the Q output of the flip flop 66 goes low to stop the counter 65 from counting the PHXTL-IN clock timing pulses.

Even though the EOS signal stays low for only a very short period of time, the Q output of the flip flop 66 stays low. This is because the PRE input of the flip flop 66 is high.

As shown in FIG. 5, the microprocessor 68 (see FIG. 8) causes a Read-CS signal to go low. The low Read-CS signal is supplied to an ENABLE input of a tri-state buffer 73 (see FIG. 6). The low Read-CS signal causes the buffer 73 to transfer the count in the counter 65 to a data bus.

After the microprocessor 68 (see FIG. 8) changes the state of the Read-CS signal as shown in FIG. 5, the count in the counter 65 (see FIG. 6) is returned to zero shortly thereafter. This is because a Clear-CS signal goes low, as shown in FIG. 5, shortly after the Read-CS signal goes high whereby the output of the AND gate 67 (see FIG. 6) is low. This low output from the AND gate 67 causes the CLR input of the counter 65 to be reset to zero by this low asynchronous input.

Accordingly, the counter 65 is able to obtain the count of the PHXTL-IN clock timing pulses indicating the time for the laser beam 20 (see FIG. 1), 21, 22, or 23 to move between the two optical sensors 34 (see FIG. 2) and 35.

L2 is the new length of each of the write lines C20, C21, C22, and C23 after adjusting the frequency at the factory to the selected fixed frequency. All of these values are shown in Table 2

TABLE 2

| Line | Actual L2 | Measured Cg2 | Measured Cs2 | Calculated Ratio | PELslice Size | Delta Length | Added Slices |
|---|---|---|---|---|---|---|---|
| C20 | 215.900 | 40799 | 44033 | 93% | 0.00529 | 0.000 | 0 |
| C21 | 215.551 | 40865 | 43938 | 93% | 0.00528 | 0.349 | 66 |
| C22 | 214.505 | 41065 | 44243 | 93% | 0.00526 | 1.395 | 266 |
| C23 | 214.853 | 40998 | 43982 | 93% | 0.00527 | 1.047 | 199 |

The ratio of Cg2/Cs2 in Table 2 is calculated after the two measurements (Cg2 and Cs2) are taken. This ratio is stored in the non-volatile RAM of the printer 10 (see FIG. 1) since the fixtures 60 (see FIG. 7) are removed from the printer 10 (see FIG. 1) after factory calibration. Therefore, this ratio is used to always approximate the Cg distance from the Cs distance obtained during operation of the printer 10 since the Cg distance cannot be measured after the fixtures 60 (see FIG. 7) are removed from the printer 10 (see FIG. 1).

With the write line C20 having been adjusted to the desired length by changing the frequency of the PELslice clock 53 (see FIG. 8) to f1, it is necessary to adjust the length of each of the write lines C21, C22, and C23 to be essentially the same as the write line C20. With AS2 (see Table 3) representing the difference in PELslice counts between the count of Cg2 for the write line C20 and the count of Cg2 for each of the other write lines C21, C22, and C23, the difference in counts is obtained.

Delta length (see Table 2) is the difference in mm between the longest write line C20 and each of the other write lines C21, C22, and C23.

With the additional PELslice clock timing pulses added to the original 40,800 PELslice clock timing pulses of each of the write lines C21, C22, and C23, a new write time (Wt2) is obtained from the following equation:

$$Wt2 = Wt1 + (AS2 \times T1) \quad (7).$$

Substituting 40,800×T1 for Wt1 in equation (7), $$Wt2 = (40,800 + AS2) \times T1 \quad (8).$$

In Table 3, L3 represents the new actual (assumed) length of each of the write lines C20, C21, C22, and C23 after adjusting the frequency of the PELslice clock 53 (see FIG. 8) to f1 (the selected fixed frequency) and adding the number of PEL slices set forth in Table 2 under Added Slices and as AS2 in Table 3.

TABLE 3

| | Calculate | | | Actual | | Factory Settings | | | |
|---|---|---|---|---|---|---|---|---|---|
| Line | AS2 | Wt2 | Insert Freq | L3 | Cg2 | Cs2 | AS2 | Ratio | |
| C20 | 0 | 564.161 | N.A. | 215.900 | 40799 | 44033 | 0 | 92.66% | |
| C21 | 66 | 565.074 | 618 | 215.900 | 40865 | 43938 | 66 | 93.01% | |
| C22 | 266 | 567.839 | 153 | 215.903 | 41065 | 44243 | 266 | 92.82% | |
| C23 | 199 | 566.913 | 205 | 215.901 | 40998 | 43982 | 199 | 93.22% | |
| | | | Max. mm | 215.903 | | | | | |
| | | | Min. mm | 215.8998 | | | | | |
| | | | Diff. mm | 0.003193 | | | | | |
| | | | Original Line error in mm | 1.4 | | | | | |

Accordingly, when the printer 10 (see FIG. 1) is shipped from the factory, the length, L3, of each of the write lines C20, C21, C22, and C23 is almost the same as shown in Table 3. Furthermore, the frequency f1 is the frequency at which the PELslice clock 53 (see FIG. 8) produces clock timing pulses, PHXTL-IN, for each of the write lines C20, C21, C22, and C23.

In operation, thermal changes in the printer 10 (see FIG. 1) can cause the lengths of the write lines C20, C21, C22, and C23 to drift as shown by the example in Table 4.

clock timing pulses have been added to the write lines C20, C21, C22, and C23. Wt4 is calculated by the following equation:

$$Wt4 = Wt1 + (AS2 \times T1) + (AS4 \times T1).$$

Figure 8:
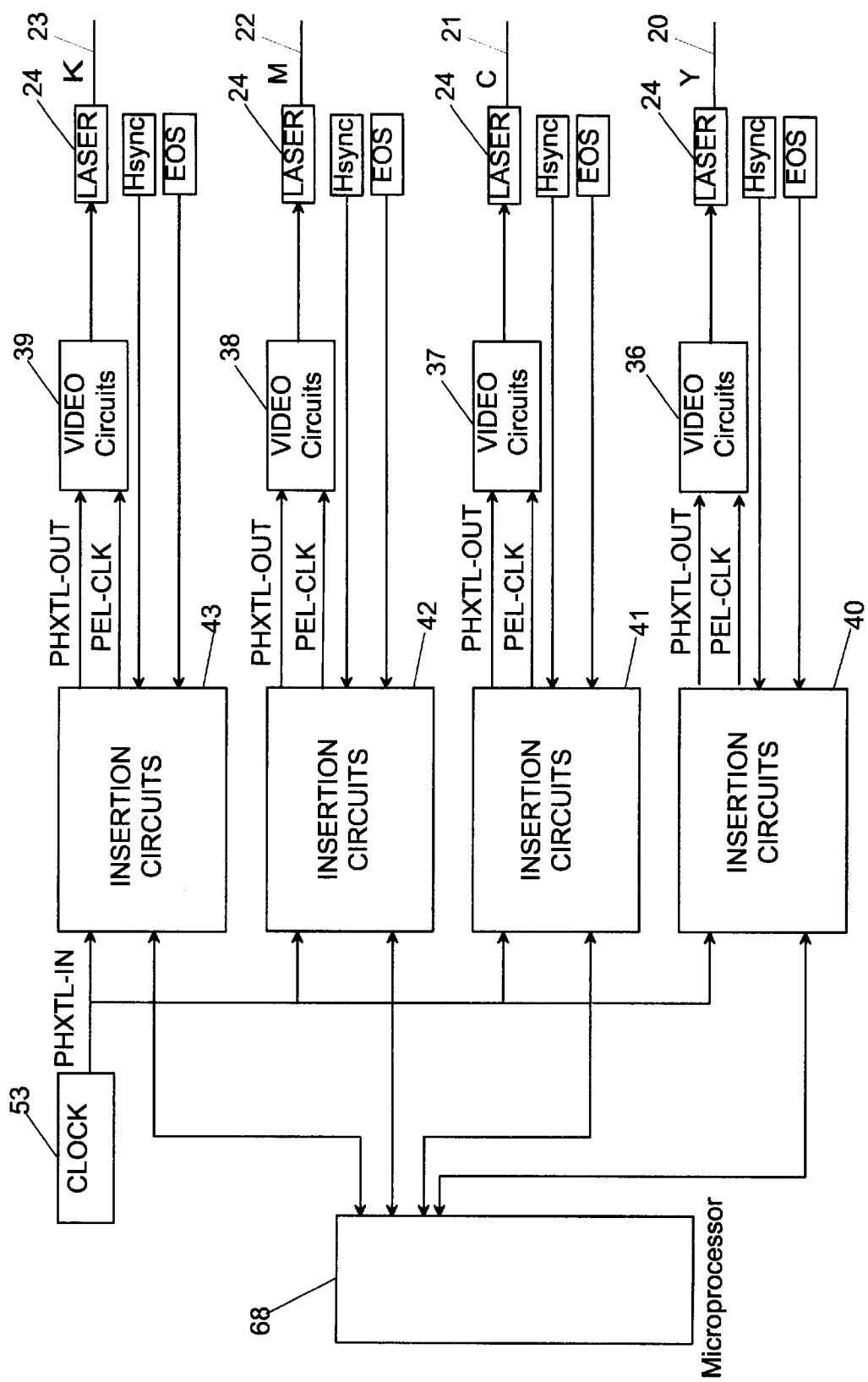
FIG. 8 is a block diagram of a circuit of the electronic control arrangement of the present invention.
Figure 9:
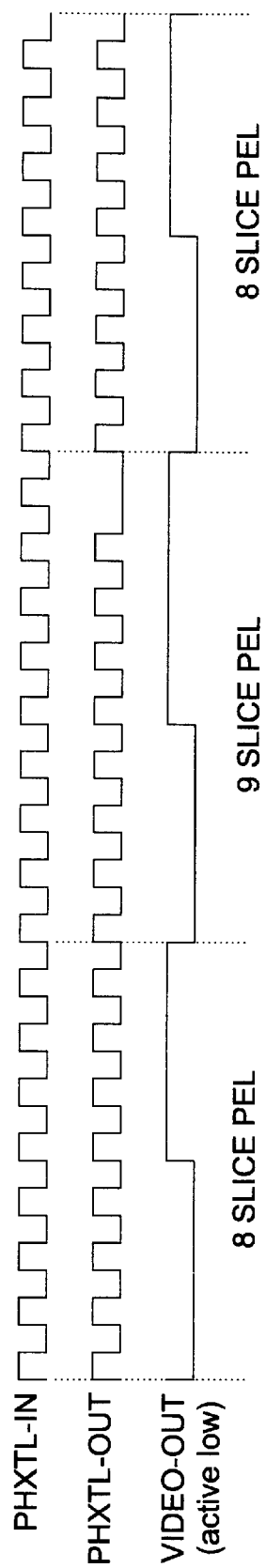
FIG. 9 is a timing diagram of the clock timing pulses of FIG. 4 and the VIDEO pulses of FIG. 5 with a PEL slice inserted in one of the output clock timing pulses.

The previously disclosed circuitry enables all of these PELslice counts to be inserted at the desired positions in the clock timing pulses produced by the clock 53 (see FIG. 8).

Figure 10:
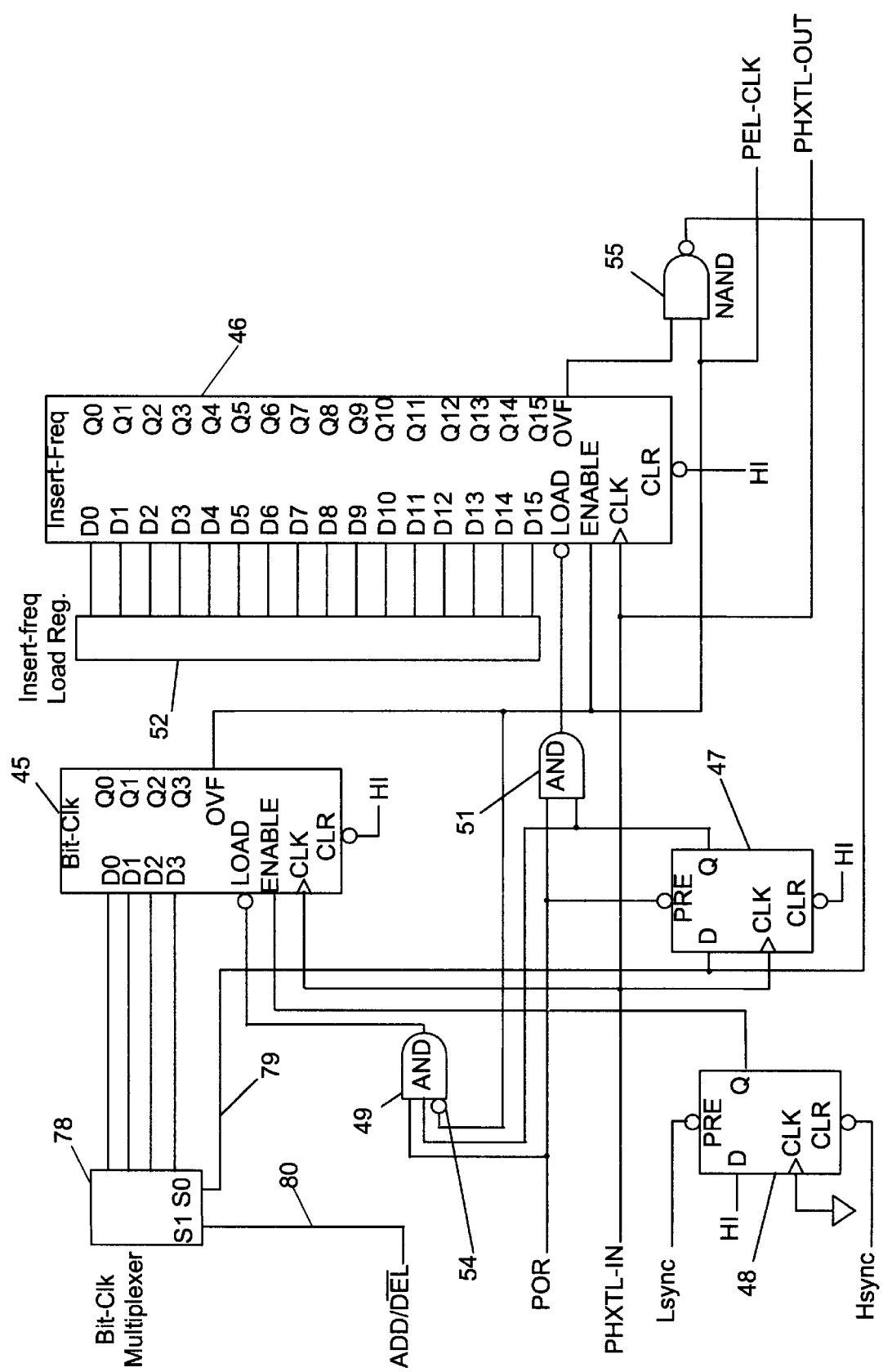
FIG. 10 is a block diagram of another embodiment of a logic circuit, similar to FIG. 3, of the electronic control arrangement of the present invention in which lengths of write lines are controlled by either adding or removing PEL slices with a separate circuit being used with each of the electrophotographic photoconductive drums.

Referring to FIG. 10, there is shown a modification of the logic circuit of FIG. 3 and the VIDEO circuits 36 (see FIG.

TABLE 4

| | Actual | | | | | | | | | |
|---|---|---|---|---|---|---|---|---|---|---|
| | | Drift | | | Measured | | Calculated | | | Estimated |
| Line | L3 | mm | L4 | V4 | Cs4 | Cg4 | Cg2–Cg4 | AS4 | Wt4 | L5 |
| C20 | 215.900 | 0.350 | 216.250 | 383312.4 | 43962 | 40733 | 66 | 0 | 0.000564 | 216.250 |
| C21 | 215.8998 | 0.175 | 216.0748 | 382383.3 | 43902 | 40831 | 34 | 32 | 0.000566 | 216.244 |
| C22 | 215.903 | −0.350 | 215.553 | 379602 | 44315 | 41131 | −66 | 132 | 0.00057 | 216.2459 |
| C23 | 215.9013 | −0.175 | 215.7263 | 380528.1 | 44018 | 41031 | −33 | 99 | 0.000568 | 216.2472 |
| Max. mm | 215.903 | | 216.250 | | | | | | | 216.25 |
| Min. mm | 215.8998 | | 215.553 | | | | | | | 216.244 |
| Diff. mm | 0.003193 | | 0.69699 | | | | | | | 0.005986 |

The number of counts between the optical sensors 34 (see FIG. 2) and 35 in the printer 10 (see FIG. 1) is periodically measured during operation of the printer 10. As the printer 10 heats up and cools down during operation, the lengths of the write lines C20, C21, C22, and C23 will increase or decrease due to the effects of the optical components of the printer 10.

Cs4, the new Cs count, is multiplied by the ratio of Cg2/Cs2, as shown in Table 3 and obtained during factory calibration, to calculate the new Cg4 count in Table 4. The difference in PELslice clock counts between Cg2 and Cg4 reflects a change in the length of the write line as shown in Table 4. The write line with the largest Cg2–Cg4 value is the new longest write line.

In Table 4, AS4 represents the number of PELslice clock timing pulses to be added to each of the write lines C20, C21, C22, and C23. AS4 is calculated by subtracting the respective values of Cg2–Cg4 from the largest value of Cg2–Cg4.

The actual length after change of each of the write lines C20, C21, C22, and C23 is identified as L4. L5 represents the actual length of each of the write lines C20, C21, C22, and C23 after the additional PELslice clock timing pulses, AS4, have been inserted for each of the write lines C20, C21, C22, and C23.

In Table 4, Wt4 is the new write time for each of the write lines C20, C21, C22, and C23 after the additional PELslice 8), 37, 38, and 39 in which control of the length of the write line may be accomplished through either adding or removing PEL slices. The circuit of FIG. 10 includes a new control signal, identified as PEL-CLK, to each of the VIDEO circuits 36 (see FIG. 8), 37, 38, and 39. On the rising edge of the PEL-CLK signal, each of the VIDEO circuits 36 (see FIG. 8), 37, 38, and 39 images the next PEL. The number of slices in the PEL-CLK period is determined by the value loaded into the Bit-Clk counter 45 (see FIG. 10).

Figure 11:
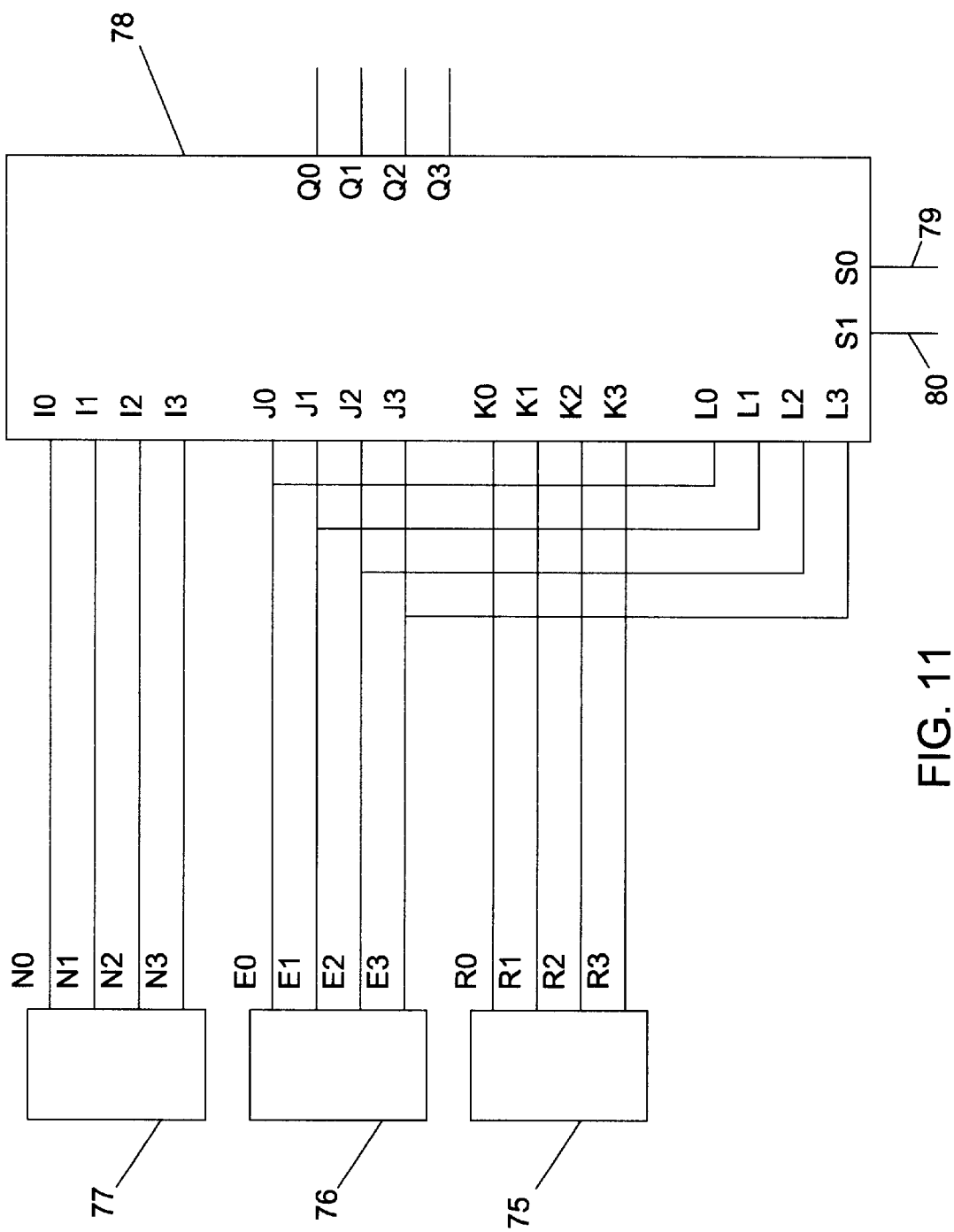
FIG. 11 is a block diagram of a multiplexer of FIG. 10 and three Bit-Clk load registers connected thereto to enable either insertion or removal of PEL slices to control the length of write lines.

Instead of the counter 45 receiving its input from the Bit-Clk load register 50 (see FIG. 3), the counter 45 has its inputs supplied from one of three Bit-Clk load registers 75 (see FIG. 11), 76, and 77. Each of the three Bit-Clk load registers 75, 76, and 77 is a four bit register.

Each of the three Bit-Clk load registers 75, 76, and 77 has its output supplied to a multiplexer 78. Two input lines 79 and 80 are connected to S0 and Si inputs, respectively, of the multiplexer 78 to determine which of the three Bit-Clk load registers 75, 76, and 77 has its output supplied through the multiplexer 78 to the counter 45 (see FIG. 10).

When the output of the Bit-Clk load register 75 (see FIG. 11) is selected through the multiplexer 78 to be loaded into the counter 45 (see FIG. 10), a PEL slice will be added to the write line. When the output of the Bit-Clk load register 76 (see FIG. 11) is selected through the multiplexer 78 to be loaded into the counter 45 (see FIG. 10), no PEL slice will be added to or removed from the write line. When the output of the Bit-Clk load register 77 (see FIG. 11) is selected through the multiplexer 78 to be loaded into the counter 45 (see FIG. 10), a PEL slice will be removed from the write line.

Accordingly, because the counter 45 is an up-counter, when the output of the Bit-Clk load register 75 (see FIG. 11) is utilized, the 2's complement of nine, which is seven, is supplied through the multiplexer 78 to the counter 45 (see FIG. 10). Use of the output of the Bit-Clk load register 76 (see FIG. 11) provides the 2's complement of eight, which is eight, to the counter 45 (see FIG. 10) from the multiplexer 78. When the output of the Bit-Clk load register 77 (see FIG. 11) is loaded into the counter 45 (see FIG. 10) through the multiplexer 78, the 2's complement of seven, which is nine, is supplied to the counter 45. 1s Another change in the logic circuit of FIG. 10 from the logic circuit of FIG. 3 is the omission of the AND gate 56. The PHXTL-OUT clock timing pulses track the PHXTL-IN clock timing pulses and have the same timing. There is no omission of any of the PHXTL-IN clock timing pulses by the PHXTL-OUT clock timing pulses.

As shown in FIG. 10, the output of the NAND gate 55 is still supplied to the D input of the flip flop 47. Additionally, the output of the NAND gate 55 is supplied over the line 79 (see FIG. 11) to the S0 input of the multiplexer 78. The multiplexer 78 has the S1 input connected by the line 80 to receive an input from the microprocessor 68 (see FIG. 8).

The output of the NAND gate 55 (see FIG. 10) is normally high unless a PEL slice is to be added or removed from the write line. That is, when the OVF output of the counter 46 goes high at the same time that the OVF output of the counter 45 goes high, the NAND gate 55 has a low output.

If no PEL slice is to be added or removed, then the count in the load register 52 is so large that the OVF output of the counter 46 never goes high during one scan line. Thus, the output of the NAND gate 55 always remains high when no PEL slice is to be added or removed.

Accordingly, when the NAND gate 55 is low, outputs Q0 (see FIG. 11), Q1, Q2, and Q3 of the multiplexer 78 receive their inputs from either I0, I1, I2, and I3 inputs or K0, K1, K2, and K3 inputs. The following table shows the relation between the states of the S0 and S1 inputs of the multiplexer 78 that determine from which of the three load registers 75, 76, and 77 that the Q0, Q1, Q2, and Q3 outputs receive their inputs:

| S1 | S0 | Q outputs |
| --- | --- | --- |
| 0 | 0 | I |
| 0 | 1 | J |
| 1 | 0 | K |
| 1 | 1 | L. |

With the NAND gate 55 (see FIG. 10) having a high output, the inputs to the Q0–Q3 outputs (see FIG. 11) of the multiplexer 78 are received from the load register 76 irrespective of whether the logic circuit is operating in the PEL slice add mode or the PEL slice remove mode.

When the logic circuit of FIG. 10 is operating in the PEL slice add mode, the microprocessor 68 (see FIG. 8) provides a high on the line 80 (see FIG. 10) to the S1 input of the multiplexer 78. This results in the multiplexer 78 routing its K0–K3 inputs, which are loaded from the load register 75 (see FIG. 11), which has a value of 7 stored therein, to the Q0–Q3 outputs.

When the logic circuit of FIG. 10 is operating in the PEL slice remove mode, the microprocessor 68 (see FIG. 8) supplies a low over the line 80 (see FIG. 11) to the S1 input of the multiplexer 78. This results in multiplexer 78 routing its I0–I3 inputs, which are loaded from the load register 77 (see FIG. 11), which has a value of nine stored therein, to the Q0–Q3 outputs.

It is determined by the lengths of the write lines as to which mode that the logic circuit of FIG. 10 will operate.

The value of nine or seven is loaded into the counter 45 (see FIG. 10) for only one PEL of counting in the counter 45. For the remainder of the counting by the counter 46, the counter 45 is loaded with the value of eight. Thus, there is only the count of nine, for example, causing a high from the OVF output of the counter 45 one time during the counting by the counter 46 before its OVF output goes high. This results in the OVF output of the counter 46 reaching its high one count sooner to cause the removal of one PEL slice.

In FIG. 3, the PEL slices are inserted in each write line without any consideration of how these inserts align with adjacent write lines. In FIG. 10, the PEL slices are inserted in or removed from each write line without any consideration of how these inserts or removals align with adjacent write lines. That is, all of the PEL slices are inserted or removed at the same PEL positions for each write line to form columns of inserted or removed slices in the process direction. These aligned columns may be visible on the print medium depending on the printed pattern. For example, with 5,100 PELs per write line and 51 PEL slices to insert or remove, each new PEL slice would be added or removed every 100 (5100/51) PELs. Accordingly, the first PEL slice would be inserted or removed at PEL 100, the second at PEL 200, the third at PEL 300, and the fourth at PEL 400. This same spacing is repeated throughout the write line of 5,100 PELs.

To avoid the possibility of visible print artifacts on the medium at the locations where the PEL slices are inserted or removed, an offset of the locations of insertion or removal of the PEL slices may be employed. This distributes the inserted or removed slices so that they do not form a visible column or pattern. For example, in a regular offset, each write line may have a constant offset of the same number of PELs such as 25 PELs from adjacent write lines, for example.

Figure 12:
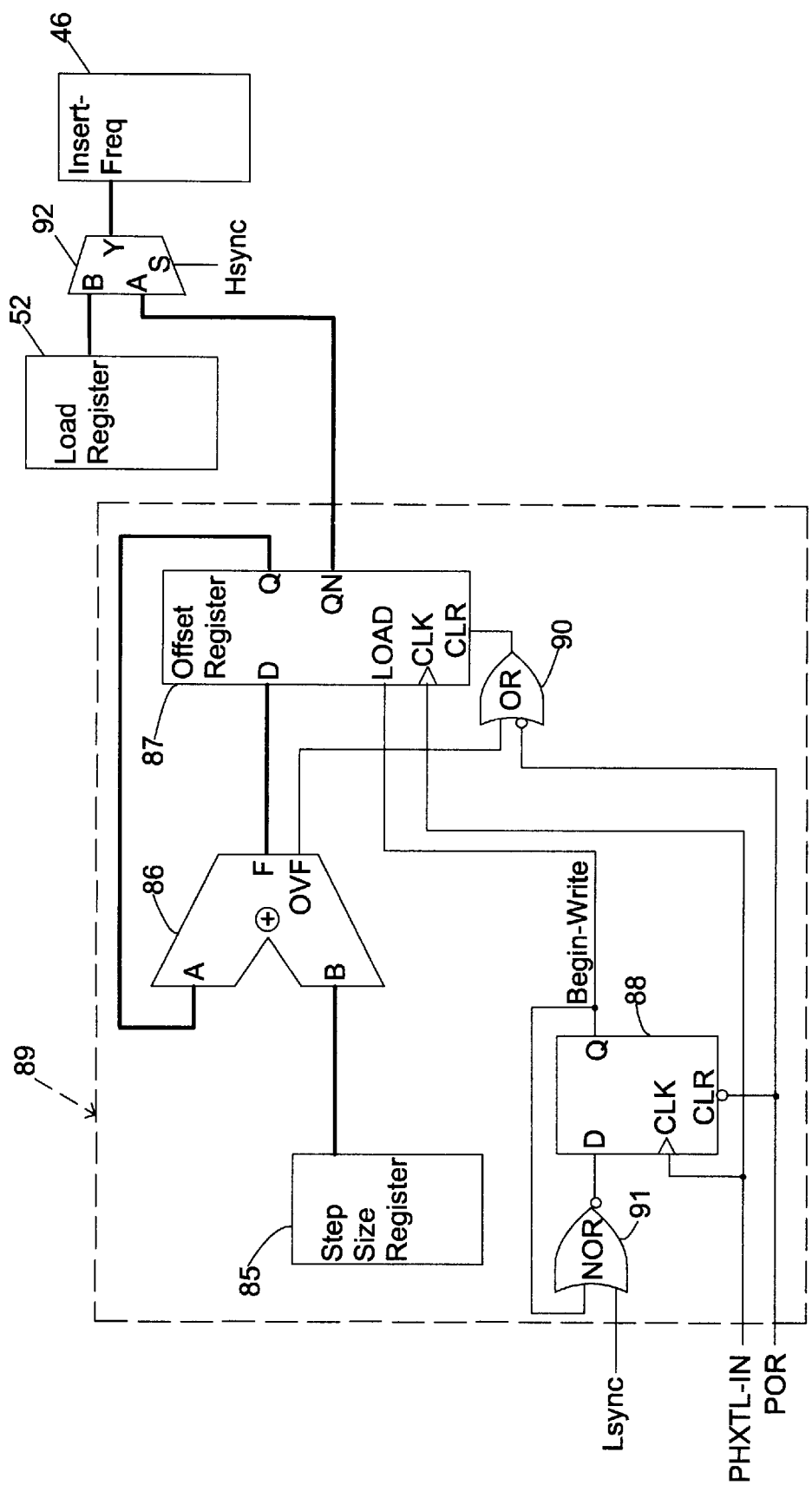
FIG. 12 is a block diagram of a circuit for offsetting the locations where PEL slices are added or removed in adjacent write lines with a constant offset being used in each write line.

Referring to FIG. 12, there is shown a circuit for use with the logic circuit of FIG. 3 or 10 to produce a regular offset. The circuit includes a step size register 85 having a value stored therein such as 25, for example, as previously discussed. The value in the step size register 85 is supplied to a B input of an adder 86. The adder 86 has its A input receiving feedback of the value of a Q output of an offset register 87.

The offset register 87 is loaded with the F output of the adder 86 to D input each time that a high Begin-Write pulse is supplied to a LOAD input of the offset register 87 from a Q output of a D-type flip flop 88. The output of the adder 86 is the sum of the previous value stored in the offset register 87 and the value stored in the step size register 85. The step size register 85, the adder 86, the offset register 87, the flip flop 88, an OR gate 90, and a NOR gate 91 comprise an offset logic circuit 89.

When the power is turned on, the POR signal is low. The POR signal is inverted to a high at CLR input of the flip flop 88. This clears the Q output of the flip flop 88 so that it is 0.

Figure 13:
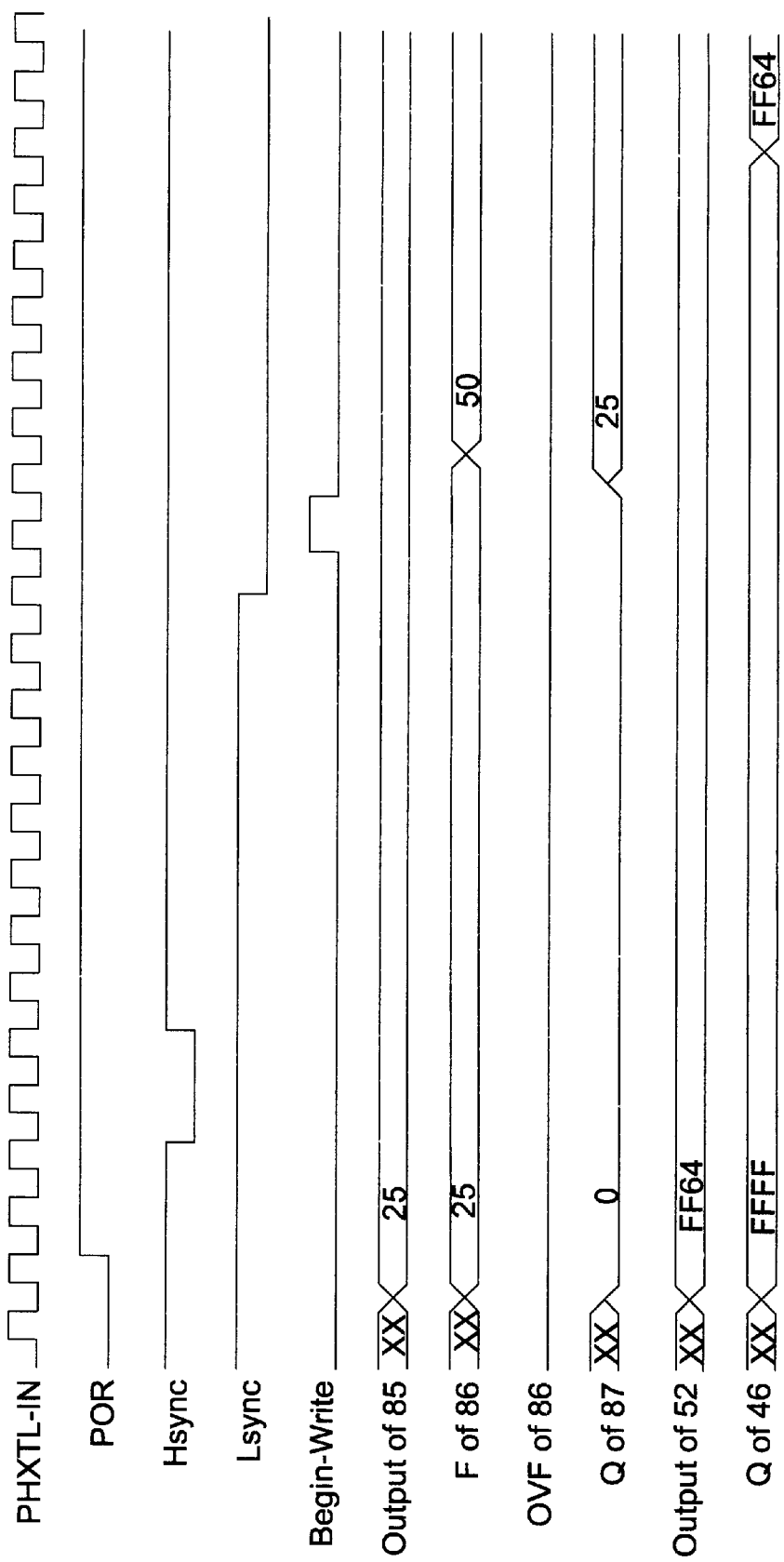
FIG. 13 is a timing diagram of various pulses occurring in the circuit of FIG. 12.

The Begin-Write pulse goes high for one PHXTL-IN period on the first PHXTL-IN rising edge after the Lsync signal goes low as shown in FIG. 13. With the Begin-Write signal high, the output of the NOR gate 91 (see FIG. 12)

returns to a low state. Thus, the next rising edge of PHXTL-IN will return the Begin-Write signal to a low state; this insures that the offset register 87 is loaded only once as a result of the assertion of the active-low Lsync signal.

The low POR signal also is inverted prior to its supply as one input to the OR gate 90. This causes the OR gate 90 to initially have a high output, which is supplied to a CLR input of the offset register 87. This sets the Q output of the offset register 87 at 0.

When the Lsync signal goes low prior to the start of each write line as shown in FIG. 13, both inputs to the NOR gate 91 (see FIG. 12) are low whereby its high output is supplied to the D input of the flip flop 88. The next of the PHXTL-IN clock timing pulses, which are supplied to CLK input of the flip flop 88, causes transfer of the high on the D input of the flip flop 88 to the Q output of the flip flop 88.

Therefore, when the Begin-Write pulse at the Q output of the flip flop 88 goes high, it causes the offset register 87 to load the value of the F output of the adder 86 into the offset register 87 on the next PHXTL-IN clock timing pulse. The Q output of the offset register 87 is fed back to the A input of the adder 86 so that at the beginning of the next write line the offset register 87 will be loaded with its current value plus the value stored in the step size register 85. The Begin-Write pulse goes high only once each write line to cause the offset register 87 to be loaded only once each write line.

The offset register 87 has its QN output, which is the inverse of the Q output, connected to an A input of a multiplexer 92. The multiplexer 92 has its B input connected to the output of the load register 52. As previously discussed, the load register 52 has a value therein equal to the spacing between PELs at which each PEL slice is to be inserted in or removed from a write line.

The multiplexer 92 has either the A or B input as its Y output depending on the state of its S input. The Y output of the multiplexer 92 is connected to the inputs of the Insert-Freq counter 46.

The S input of the multiplexer 92 is the same as the Hsync signal. When the Hsync signal is low at the start of a write line, the A input to the multiplexer 92 is routed to the Y output. This is the QN output of the offset register 87.

When the Hsync signal is high, the B input to the multiplexer 92 is routed to the Y output. This is the output of the load register 52.

As shown in FIG. 13, while the Hsync signal is high when the Lsync signal goes low, it is low prior thereto. Accordingly, the QN output (see FIG. 12) of the offset register 87 is first loaded in the counter 46 prior to the Lsync signal going low. Thus, the change in the QN output of the offset register 87 will actually be applied to the counter 46 on the subsequent write line.

Therefore, during POR, QN is FF since the offset register 87 was cleared. Thus, the first PEL slice is inserted or removed at PEL 1.

Since the Q output of the offset register 87 is fed back to the A input of the adder 86, the Q output of the offset register 87 has a value of 0 for the first write line and a value of 25 for the second write line in the example where the step size register 85 is loaded with a constant value of 25. With the constant value of 25 supplied to the input B of the adder 86, the Q output of the offset register 87 has a value of 50 for the third write line.

When the Q output of the offset register 87 reaches a value of 125, the next cycle causes the adder 86 to have its OVF output provide a high to a CLR input of the offset register 87 through the OR gate 90. This is because the adder 86 is preferably a seven bit adder so that its OVF output goes high when the value at the F output exceeds 127.

Because the offset register 87 supplies a seven bit output while the counter 46 is preferably a sixteen bit counter, the input to the multiplexer 92 is expanded to sixteen by tying the upper nine bits to a high logic state. This is shown in Table 5. When the OVF output of the adder 86 goes high, the Q output of the offset register 87 is set to zero for the next cycle (seventh write line) as disclosed in Table 5.

TABLE 5

| | Step Size | Offset Q | Offset Q (binary) | Offset QN (binary) | Multiplex 92 input from Offset QN (binary) | Location of first PEL slice insertion or removal |
|---|---|---|---|---|---|---|
| Write Line 1 | 25 | 0 | 0000000 | 1111111 | 1111111111111111 | PEL 1 |
| Write Line 2 | 25 | 25 | 0011001 | 1100110 | 1111111111100110 | PEL 26 |
| Write Line 3 | 25 | 50 | 0110010 | 1001101 | 1111111111001101 | PEL 51 |
| Write Line 4 | 25 | 75 | 1001011 | 0110100 | 1111111110110100 | PEL 76 |
| Write Line 5 | 25 | 100 | 1100100 | 0011011 | 1111111110011011 | PEL 101 |
| Write Line 6 | 25 | 125 | 1111101 | 0000010 | 1111111110000010 | PEL 126 |
| Write Line 7 | 25 | 0 | 0000000 | 1111111 | 1111111111111111 | PEL 1 |
| Write Line 8 | 25 | 25 | 0011001 | 1100110 | 1111111111100110 | PEL 26 |

As shown in Table 5, insertion or removal of PEL slices in the first write line would begin at PEL 1. In the second write line, insertion or removal of PEL slices would begin at PEL 26 (1+25). The third write line would have insertion or removal of PEL slices start at PEL 51 (1+50). In the fourth write line, insertion or removal of PEL slices would begin at PEL 76 (1+75). The fifth write line would have the first PEL slice inserted or removed at PEL 101 (1+100), and insertion or removal of PEL slices would start at 126 (1+125) in the sixth write line. After this insertion or removal of the PEL slices for the six write lines, the sequence would be repeated for the next six write lines.

TABLE 6

|  | Step Size | Offset Q | Offset Q (binary) | Offset QN (binary) | Multiplex 92 input from Offset QN (binary) | Location of first PEL slice insertion or removal |
|---|---|---|---|---|---|---|
| Write Line 1 | 25 | 0 | 0000000 | 1111111 | 1111111111111111 | PEL 1 |
| Write Line 2 | 25 | 25 | 0011001 | 1100110 | 1111111111100110 | PEL 26 |
| Write Line 3 | 25 | 50 | 0110010 | 1001101 | 1111111111001101 | PEL 51 |
| Write Line 4 | 25 | 75 | 1001011 | 0110100 | 1111111110110100 | PEL 76 |
| Write Line 5 | 25 | 100 | 1100100 | 0011011 | 1111111110011011 | PEL 101 |
| Write Line 6 | 25 | 125 | 1111101 | 0000010 | 1111111110000010 | PEL 126 |
| Write Line 7 | 25 | 22 | 0010110 | 1101001 | 1111111111101001 | PEL 23 |
| Write Line 8 | 25 | 47 | 0101111 | 1010000 | 1111111111010000 | PEL 48 |

Table 6 shows the locations of PEL slice insertion or removal when the adder 86 (see FIG. 12) does not have the OVF output connected to the OR gate 90. In this modification of the circuit of FIG. 12, the seven-bit adder 86 performs the function F=(A+B) Modulo 128 so that the F output contains the lower seven bits of the addition operation.

Figure 14:
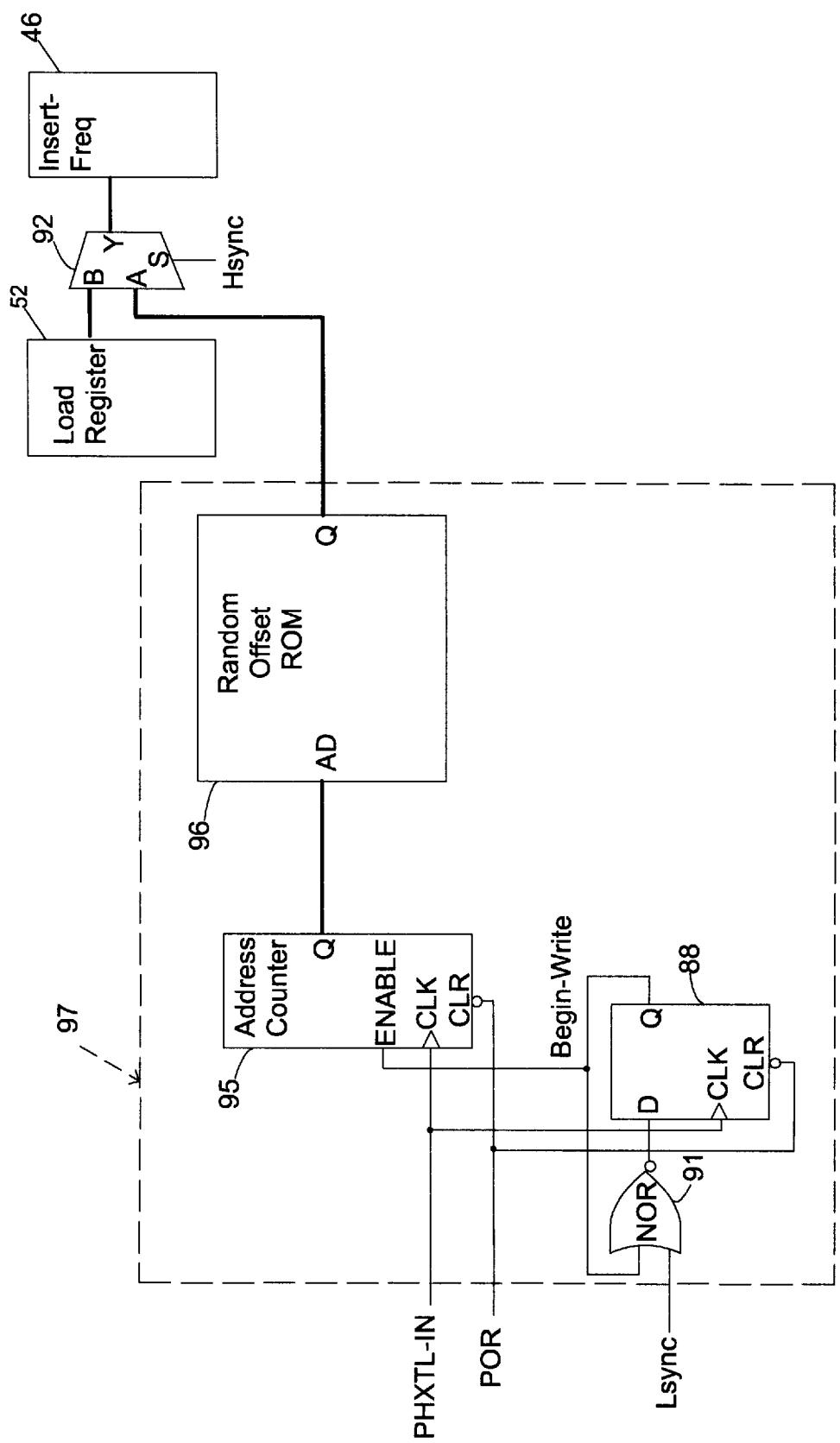
FIG. 14 is a block diagram of another embodiment of a circuit for randomly offsetting the locations where PEL slices are added or removed in adjacent write lines.

FIG. 14 discloses a circuit producing a pseudo-random offset value to be applied for the duration of each write line. As opposed to the circuit of FIG. 12 wherein each write line is offset from the previous write line by the amount stored in the step size register 85, the circuit of FIG. 14 offsets each write line by a pseudo-random number fetched from a random offset ROM 96. In this configuration, the offset applied to the PEL slices of each write line is unrelated to the offset applied to adjacent write lines.

The circuit of FIG. 14 includes the Insert-Freq counter 46, the Insert-Freq load register 52, and the multiplexer 92 of the circuit of FIG. 12. The multiplexer 92 is controlled by the state of the Hsync signal in the same manner as described relative to FIG. 12.

The flip flop 88 and the NOR gate 91 also are utilized in the same manner as described with respect to FIG. 12. The Q output of the flip flop 88 generates a high Begin-Write pulse in the same manner as described with respect to FIG. 12.

In the circuit of FIG. 14, the Begin-Write pulse is supplied to an ENABLE input of an address counter 95. The address counter 95 has its Q output connected to an AD input of the random offset ROM 96. The random offset ROM 96 includes a plurality of addresses with each containing a different offset value, which was randomly generated externally and then stored in the random offset ROM 96.

Accordingly, after each time that the address counter 95, which is preferably a seven bit counter, receives a high Begin-Write pulse at its ENABLE input, the next PHXTL-IN clock timing pulse to CLK input of the address counter 95 increments the Q output of the address counter 95 by a count of one. When the Q output of the address counter 95 increments by one, a new address in the random offset ROM 96 is selected.

Each address in the ROM 96 has a different random value. This random value is supplied from Q output of the ROM 96 to the multiplexer 92. In the same manner as described with regard to FIG. 12, the Q output of the ROM 96 (see FIG. 14) is routed by the multiplexer 92 to the counter 46 prior to the start of the write line. The value stored in the load register 52 is equal to the spacing between the PELs at which a PEL slice is inserted or removed and is routed to the counter 46 through the multiplexer 92 for the remainder of the write line.

It should be understood that the ROM 96 could be a RAM, if desired. The RAM would be loaded by software from the microprocessor 68 (see FIG. 8).

The flip flop 88 (see FIG. 14), the NOR gate 91, the address counter 95, and the random offset ROM 96 comprise an offset logic circuit 97.

Figure 15:
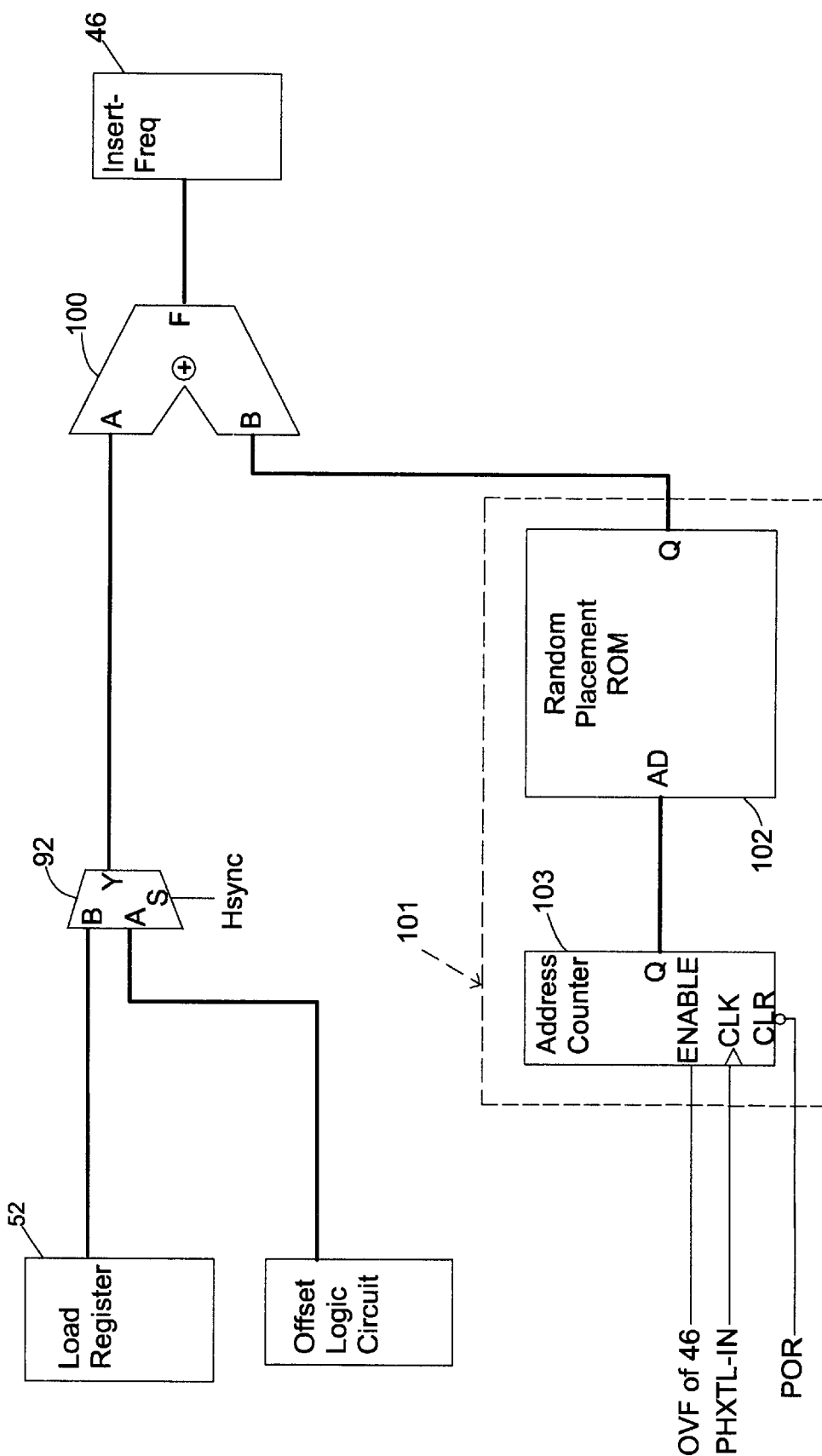
FIG. 15 is a block diagram of a circuit for use with the circuit of FIG. 12 or 14 in which PEL slices are added or removed in a write line at random locations.

Referring to FIG. 15, there is shown a circuit in which random placement or removal of each of the PEL slices may be utilized with the offset logic circuit 89 (see FIG. 12), the modified arrangement of the offset logic circuit 89 as shown by Table 6, or the offset logic circuit 97 (see FIG. 14).

Furthermore, the circuit of FIG. 15 could be utilized without any offset logic circuit. That is, only the load register 52 would be connected to the input A of an adder 100. This would result in random placement of a PEL slice addition or subtraction throughout each write line with no offset where the PEL slices are inserted or removed.

The output of the multiplexer 92 (see FIG. 15) is supplied to an input A of the adder 100. A random placement logic circuit 101 includes a random placement ROM 102 and an address counter 103. The random placement ROM 102 has a plurality of addresses with each address having a different value, preferably between 0 and 15. The values stored in each address are randomly generated externally and then stored in the ROM 102 when the device is manufactured.

The address counter 103 is preferably a four bit counter. When the POR signal is low at the start, it is inverted and is applied as a high at CLR input of the address counter 103 to set the count in the counter 103 to 0.

Each time that the counter 46 has its OVF output go high, the ENABLE input of the address counter 103 allows the next PHXTL-IN clock timing pulse at CLK input of the address counter 103 to increase the count in the address counter 103 by one. Therefore, the Q output of the address counter 103 increases by a count of one to select the next address at AD input of the ROM 102. This causes the value at the Q output for the specific address to be supplied to B input of the adder 100.

Accordingly, each time that a PEL slice is to be inserted in or removed from a write line because the counter 46 reaches the count at which its OVF output goes high, the next count in the counter 46 from the output F of the adder 100 is varied not only by the Y output of the multiplexer 92 but also by the new output of the ROM 102.

It should be understood that the ROM 102 could be a RAM, if desired. The RAM would be loaded by software from the microprocessor 68 (see FIG. 8).

Thus, there is random placement of each insertion or removal of a PELslice in a write line. This prevents the presence of visible artifacts in a grouping of half tone cells.

While the electronic control arrangement of the present invention has been shown and described for use with the color laser printer 10 (see FIG. 1), it should be understood that it could be employed with a non-color laser printer. With a non-color laser printer, the electronic control arrangement of the present invention would be utilized to maintain the lengths of the write lines substantially constant as is particularly desired when printing on preprinted forms in a non-color laser printer.

While the electronic control arrangement has been shown and described as measuring the distance Xg between the sensors 62 (see FIG. 7) and 63 for each of the write lines during factory adjustment, it should be understood that an assumption of the distance Xg between the sensors 62 and 63 may be utilized. However, this would produce a substantially larger error since the assumption of the distance Xg would be based on this distance being the same for each of the write lines whereas the tolerances of this distance would produce substantial differences between the lengths as previously discussed. For example, instead of 0.004 mm being the maximum difference (error) between the lengths of the write lines C20–C23 as shown in Table 4, this maximum difference (error) between the lengths of the write lines C20–C23 could increase to 0.039 mm, nearly ten times larger.

Furthermore, the lengths of the write lines on each of the electrophotographic photoconductive drums 11 (see FIG. 1), 12, 13, and 14 could be determined by measuring the write line on the FTM 32, for example. The FTM 32 would include the driven endless belt or a sheet of medium such as paper, for example, advanced by an endless belt.

While the electrophotographic photoconductive drums 11 (see FIG. 1), 12, 13, and 14 have been shown and described as the photoconductors scanned by the laser beams 20, 21, 22, and 23, respectively, any other suitable photoconductor or light receiving element, such as film, may be employed, if desired.

An advantage of this invention is that it electronically changes the number of PEL slices in selected PELs in one or more write lines to obtain write lines of substantially equal length. A further advantage of this invention is that there is no active adjustment of scanner optics to correct the lengths of the write lines.

For purposes of exemplification, preferred embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A color laser printer including:
   a plurality of photoconductors;
   a plurality of scanning means equal in number to the number of said photoconductors; each of said scanning means including a laser beam to scan simultaneously a different one of said photoconductors;
   electronic control means for electronically changing the length of at least one of a plurality of write lines scanned on each of said photoconductors during printing operation to make the write lines substantially equal when the initial lengths of the write lines produced by each of said scanning means are not substantially equal;
   each of said photoconductors producing a different selected color selectively along the write line after being scanned by said laser beam of one of said scanning means to produce the different selected color at any PEL along the write line;
   means for depositing each of color images of said photoconductors on a medium in an overlying relation to form a resulting color line on the medium substantially equal to the length of each of the write lines;
   said electronic control means including:
      a clock operating at a fixed frequency to produce equal clock timing pulses of the same frequency for supply to each of said scanning means;
      separate selective changing means for electronically selectively changing the number of clock timing pulses for selected PELs in at least one of the write lines on at least one of said photoconductors to make the lengths of the write lines on all of said photoconductors substantially equal;
      and periodically determining means for periodically determining the length of at least one of the write lines on each of said photoconductors;
      each of said separate selective changing means including means for changing the number of clock timing pulses for the selected PELs for the at least one write line on at least one of said photoconductors to change the length of the write line on said at least one photoconductor to make the lengths of the write lines on all of said photoconductors substantially equal;
      separate beam sensing means for each of said laser beams and equal in number to the number of said laser beams;
      each of said separate beam sensing means including:
         two sensing means spaced a predetermined distance apart to provide a measuring line therebetween;
         and said two sensing means being passed over by one of said laser beams;
      said periodically determining means including measuring means for measuring the number of clock timing pulses required for each of said laser beams to move between said two sensing means of one of said separate beam sensing means to obtain the length of the measuring line relative to the lengths of the measuring lines on the other of said photoconductors;
      and means for utilizing the product of a stored value of the ratio of the length of a write line to the length of the measuring line and the number of clock timing pulses measured by said measuring means to change the length of the write lines on at least one of said photoconductors to make the lengths of the write lines substantially equal on all of said photoconductors.

2. The color laser printer according to claim 1 including ratio determining means for determining the ratio of the length of the write line to the length of the measuring line to provide the stored value of the ratio of the length of the write line to the length of the measuring line.

3. The color laser printer according to claim 2 in which said ratio determining means includes:
   length determining means for determining the lengths of the write line and the measuring line for each of said photoconductors at an initial frequency of the clock;
   means for adjusting the frequency of the clock to the selected fixed frequency to have the length of one of the write lines substantially equal to a predetermined length;

and determining means for determining the lengths of the write line and the measuring line for each of said photoconductors at the adjusted frequency of the clock so that the ratio of the length of the write line to the length of the measuring line on each of said photoconductors is determined.

4. The color laser printer according to claim 3 in which each of said photoconductors is an electrophotographic photoconductive drum.

5. A color laser printer including:

a plurality of photoconductors;

a plurality of scanning means equal in number to the number of said photoconductors;

each of said scanning means including a laser beam to scan simultaneously a different one of said photoconductors;

electronic control means for electronically changing the length of at least one of a plurality of write lines scanned on each of said photoconductors during printing operation to make the write lines substantially equal when the initial lengths of the write lines produced by each of said scanning means are not substantially equal;

each of said photoconductors producing a different selected color selectively along the write line after being scanned by said laser beam of one of said scanning means to produce the different selected color at any PEL along the write line;

means for depositing each of color images of said photoconductors on a medium in an overlying relation to form a resulting color line on the medium substantially equal to the length of each of the write lines;

said electronic control means including:
  a clock operating at a fixed frequency to produce equal clock timing pulses of the same frequency for supply to each of said scanning means;
  and separate selective changing means for electronically selectively changing the number of clock timing pulses for selected PELs in at least one of the write lines on at least one of said photoconductors to make the lengths of the write lines on all of said photoconductors substantially equal;
  and offset producing means for producing an offset at locations in each of the write lines on each of said photoconductors at which the number of the clock timing pulses for each of the selected PELs is changed.

6. The color laser printer according to claim 5 in which said offset producing means includes means for producing a constant offset for each of the write lines on each of said photoconductors but beginning the first offset for each of the write lines at a different PEL than adjacent write lines.

7. The color laser printer according to claim 5 in which said offset producing means includes means for producing an offset of a different random value for each of the write lines on each of said photoconductors.

8. A color laser printer including:

a plurality of photoconductors;

a plurality of scanning means equal in number to the number of said photoconductors;

each of said scanning means including a laser beam to scan simultaneously a different one of said photoconductors;

electronic control means for electronically changing the length of at least one of a plurality of write lines scanned on each of said photoconductors during printing operation to make the write lines substantially equal when the initial lengths of the write lines produced by each of said scanning means are not substantially equal;

each of said photoconductors producing a different selected color selectively along the write line after being scanned by said laser beam of one of said scanning means to produce the different selected color at any PEL along the write line;

means for depositing each of color images of said photoconductors on a medium in an overlying relation to form a resulting color line on the medium substantially equal to the length of each of the write lines;

said electronic control means including:
  a clock operating at a fixed frequency to produce equal clock timing pulses of the same frequency for supply to each of said scanning means;
  and separate selective changing means for electronically selectively changing the number of clock timing pulses for selected PELs in at least one of the write lines on at least one of said photoconductors to make the lengths of the write lines on all of said photoconductors substantially equal;

and said separate selective changing means of said electronic control means for each of said laser beams changing the number of clock timing pulses only at inactive PELs or at PELs having at least an inactive portion unless there is an insufficient number of such PELs.

9. A color laser printer including:

a plurality of photoconductors;

a plurality of scanning means equal in number to the number of said photoconductors;

each of said scanning means including a laser beam to scan simultaneously a different one of said photoconductors;

electronic control means for electronically changing the length of at least one of a plurality of write lines scanned on each of said photoconductors during printing operation to make the write lines substantially equal when the initial lengths of the write lines produced by each of said scanning means are not substantially equal;

each of said photoconductors producing a different selected color selectively along the write line after being scanned by said laser beam of one of said scanning means to produce the different selected color at any PEL along the write line;

means for depositing each of color images of said photoconductors on a medium in an overlying relation to form a resulting color line on the medium substantially equal to the length of each of the write lines;

said electronic control means including:
  a clock operating at a fixed frequency to produce equal clock timing pulses of the same frequency for supply to each of said scanning means;
  and separate selective changing means for electronically selectively changing the number of clock timing pulses for selected PELs in at least one of the write lines on at least one of said photoconductors to make the lengths of the write lines on all of said photoconductors substantially equal;

and said separate selective changing means of said electronic control means for each of said laser beams changing the number of clock timing pulses only at inactive PELs or at PELs having at least an inactive portion substantially equally spaced from each other unless there is an insufficient number of such PELs.

10. A laser printer including: at least one photoconductor;
at least one scanning means including a laser beam to scan a plurality of write lines on said at least one photoconductor;
electronic control means for electronically controlling during printing operation a length of the write lines scanned on said at least one photoconductor so that at least two of the lengths of the write lines produced by said at least one scanning means are maintained substantially constant;
said electronic control means including:
  a clock operating at a fixed frequency to produce equal clock timing pulses of the same frequency for supply to each of said scanning means;
  and selective changing means for electronically selectively changing the number of clock timing pulses for selected PELs in the write lines on said at least one photoconductor to make the lengths of the write lines substantially equal to a predetermined length;
offset producing means for producing an offset at locations in each of the write lines on said at least one photoconductor at which the number of the clock timing pulses for each of the selected PELs is changed;
and said offset producing means including means for producing a constant offset for each of the write lines on said at least one photoconductor but beginning the first offset for each of the write lines at a different PEL than adjacent write lines.

11. A laser printer including:
at least one photoconductor;
at least one scanning means including a laser beam to scan a plurality of write lines on said at least one photoconductor;
electronic control means for electronically controlling during printing operation a length of the write lines scanned on said at least one photoconductor so that at least two of the lengths of the write lines produced by said at least one scanning means are maintained substantially constant;
said electronic control means including:
  a clock operating at a fixed frequency to produce equal clock timing pulses of the same frequency for supply to each of said scanning means;
  and selective changing means for electronically selectively changing the number of clock timing pulses for selected PELs in the write lines on said at least one photoconductor to make the lengths of the write lines substantially equal to a predetermined length;
and said selective changing means of said electronic control means for said laser beam of said at least one scanning means changing the number of clock timing pulses only at inactive PELs or at PELs having at least an inactive portion unless there is an insufficient number of such PELs.

12. A laser printer including:
at least one photoconductor;
at least one scanning means including a laser beam to scan a plurality of write lines on said at least one photoconductor;
electronic control means for electronically controlling during printing operation a length of the write lines scanned on said at least one photoconductor so that at least two of the lengths of the write lines produced by said at least one scanning means are maintained substantially constant;
said electronic control means including:
  a clock operating at a fixed frequency to produce equal clock timing pulses of the same frequency for supply to each of said scanning means;
  and selective changing means for electronically selectively changing the number of clock timing pulses for selected PELs in the write lines on said at least one photoconductor to make the lengths of the write lines substantially equal to a predetermined length;
  and said selective changing means of said electronic control means for said laser beam of said at least one scanning means changing the number of clock timing pulses only at inactive PELs or at PELs having at least an inactive portion substantially equally spaced from each other unless there is an insufficient number of such PELs.

13. A method or controlling the length of a write line on each of a plurality of photoconductors produced by a different laser beam simultaneously scanning each of the photoconductors of printheads in a color laser printer during printing operation to maintain substantially equal lengths of the write lines produced on the photoconductors by the laser beams including:
  determining the length of the write line on each of the photoconductors by determining the number of PEIslice clock timing pulses of a PELslice clock comprising the length of each of the write lines on each of the photoconductors;
  changing the length of the write line on at least one of the photoconductors so that the lengths of the write lines on all of the photoconductors are substantially equal by changing the number of the PELslice clock timing pulses for the write line on the at least one photoconductor so that the lengths of the write lines on all of the photoconductors are substantially equal;,
  periodically determining the number of the PELslice clock timing pulses comprising the length of a separate measuring line on the printhead for each of the photoconductors by the laser beam scanning the measuring line;
  using the product of a previously determined ratio of the length of the write line on each of the photoconductors to the length of the corresponding measuring line for use with the same photoconductor and the periodically determined number of the PELslice clock timing pulses for the same photoconductor to determine the number of the PELslice clock timing pulses correlated to the actual length of the write line on the same photoconductor;
  and changing the number of the PELslice clock timing pulses for the lengths of the write lines on at least one of the photoconductors so that the write lines on all of the photoconductors are substantially equal.

14. The method according to claim 13 including producing an offset between the locations in each of the write lines at which the number of the PELslice clock timing pulses for each selected PEL is change.

15. The method according to claim 14 including producing a constant offset for each of the write lines but beginning the first offset for each of the write lines at a different PEL than adjacent write lines.

16. The method according to claim 14 including producing an offset of a random value for each of the write lines.

17. The method according to claim 13 including randomly shifting each location in each of the write lines at which the number of the PELslice clock timing pulses is changed.

18. A method or controlling the length of a write line on each of a plurality of photoconductors produced by a different laser beam simultaneously scanning each of the photoconductors of printheads in a color laser printer during printing operation to maintain substantially equal lengths of the write lines produced on the photoconductors by the laser beams including:

determining the length of the write line on each of the photoconductors by determining the number of PELslice clock timing pulses of a PELslice clock comprising the length of each of the write lines on each of the photoconductors;

changing the length of the write line on at least one of the photoconductors so that the lengths of the write lines on all of the photoconductors are substantially equal by changing the number of the PELslice clock timing pulses for the write line on the at least one photoconductor so that the lengths of the write lines on all of the photoconductors are substantially equal;

and changing the number of the PELslice clock timing pulses inserted into or removed from the write lines on at least one of the photoconductors so that the write lines on all of the photoconductors are substantially equal.

19. A method for controlling the length of a write line on a photoconductor produced by a laser beam scanning the photoconductor of a printhead in a laser printer during printing operation to maintain the lengths of the write lines produced on the photoconductor by the laser beam substantially constant including:

determining the length of each of two write lines on the photoconductor by the laser beam scanning the photoconductor by determining the number of PELslice clock timing pulses of a PELslice clock comprising the length of each of two write lines on the photoconductor by the laser beam scanning the photoconductor;

and changing the length of one of the write lines so that the two write lines are substantially equal, said step of changing the length being accomplished by changing the number of the PELslice clock timing pulses of the one write line.

20. The method according to claim 19 including producing an offset between the location in each of the write lines at which the number of the clock timing pulses for each selected PEL is changed.

21. The method according to claim 20 including producing a constant offset for each of the write lines but beginning the first offset for each of the write lines at a different PEL than adjacent write lines.

22. The method according to claim 20 including producing an offset of a random value for each of the write lines.

23. The method according to claim 19 including:

periodically determining the number of the PELslice clock timing pulses comprising the length of a measuring line on the printhead during scanning of the photoconductor and the measuring line by the laser beam;

using the product of a previously determined ratio of the length of a write line on the photoconductor to the length of the measuring line on the printhead and the periodically determined number of the PELslice clock timing pulses to determine the number of the PELslice clock timing pulses comprising the length of each of the two write lines on the photoconductor;

and changing the number of the PELslice clock timing pulses for one of the two write lines so that the lengths of the write lines are substantially equal.

24. The method according to claim 19 including randomly shifting each location in each of the write lines at which the number of the PELslice clock timing pulses is changed.

25. A method for controlling the length of a write line on each of a plurality of photoconductors produced by a different laser beam simultaneously scanning each of the photoconductors of printheads in a color laser printer to maintain substantially equal lengths of the write lines produced on the photoconductors by the laser beams including:

selecting a fixed frequency of a clock producing equal clock timing pulses for each of the laser beams so that the write lines on each of the photoconductors are substantially equal;.

determining a ratio of the length of the write line on each of the photoconductors to the length of a measuring line on the same photoconductor at the selected fixed frequency of the clock producing equal clock timing pulses for each of the laser beams so that the lengths of the write lines on all of the photoconductors are substantially equal;

periodically determining the length of each of the measuring lines by the number of clock timing pulses produced for each of the laser beams during scanning of the write line on each of the photoconductors by its corresponding laser beam;

using the product of the ratio of the length of the write line on each of the photoconductors to the length of the measuring line on the same photoconductor for each of the photoconductors and the periodically determined number of clock timing pulses during scanning of each of the photoconductors by its corresponding laser beam to ascertain if the length of the write line on at least one of the photoconductors has changed and the amount of change;

and changing the selected number of the clock timing pulses without changing the selected fixed frequency of the clock at selected PELs for each of the laser beams having the length of a write line not substantially equal to a selected value to change the length of each of the write lines not substantially equal to the selected value so that the lengths of the write lines on all of the photoconductors are substantially equal.

26. The method according to claim 25 including producing an offset between the locations in each of the write lines on each of the photoconductors at which the number of the clock timing pulses for each of the selected PEL is changed.

27. The method according to claim 26 including producing a constant offset for each of the write lines but beginning the first offset for each of the write lines at a different PEL than adjacent write lines.

28. The method according to claim 26 including producing an offset of a random value for each of the write lines.

29. The method according to claim 25 in which the ratio of the length of the write line on each of the photoconductors to the length of the measuring line on the same photoconductor is determined through:

initially determining the lengths of the write line and the measuring line on each of the photoconductors at an initial frequency of the clock producing the equal clock timing pulses;

adjusting the frequency of the clock to the selected fixed frequency so that the length of the write line on at least one of the photoconductors is substantially equal to the selected value;

measuring the lengths of the write line and the measuring line on each of the photoconductors at the selected fixed frequency of the clock;

and determining the ratio of the length of the write line on each of the photoconductors to the length of the measuring line on the same photoconductor at the selected fixed frequency of the clock.

30. The method according to claim 25 including randomly shifting each location in each of the write lines at which the number of the PELslice clock timing pulses is changed.

31. A method for controlling the length of a write line on a photoconductor produced by a laser beam scanning the photoconductor in a laser printer to maintain the lengths of the write lines produced on the photoconductor by the laser beam substantially constant including:

selecting a fixed frequency of a clock producing equal clock timing pulses for the laser beam so that the write line has a desired length;

determining a ratio of the length of the write line on the photoconductor to the length of a measuring line at the selected fixed frequency of the clock producing equal clock timing pulses for the laser beam so that the write line has a desired length;

periodically determining the length of the measuring line by the number of clock timing pulses produced during scanning of the measuring line on the photoconductor by the laser beam;

using the product of the ratio of the length of the write line on the photoconductor to the length of the measuring line on the photoconductor and the periodically determined number of clock timing pulses during scanning of the photoconductor by the laser beam to ascertain if the length of the write line has changed and the amount of change;

and changing the selected number of the clock timing pulses for the write line without changing the selected fixed frequency of the clock at selected PELs along the write line to change the length of the write line to the desired length if the length of the write line has changed.

32. The method according to claim 31 including producing an offset between the locations in each of the write lines on photoconductor at which the number of the clock timing pulses for each selected PEL is changed.

33. The method according to claim 32 including producing a constant offset for each of the write lines but beginning the first offset for each of the write lines at a different PEL than adjacent write lines.

34. The method according to claim 32 including producing an offset of a random value for each of the write lines.

35. The method according to claim 31 in which the ratio of the length of the write line, on the photoconductor to the length of the measuring line on the photoconductor is determined through:

initially determining the lengths of the write line and the measuring line at an initial frequency of the clock producing the equal clock timing pulses;

adjusting the frequency of the clock to the selected fixed frequency so that the length of the write line is substantially equal to the desired length of the write line;

measuring the lengths of the write line and the measuring line at the selected fixed frequency of the clock;

and determining the ratio of the length of the write line on the photoconductor to the length of the measuring line on the photoconductor at the selected fixed frequency of the clock.

36. The method according to claim 31 including randomly shifting each location in each of the write lines at which the number of the PELslice clock timing pulses is changed.

37. A laser printer including:

a plurality of light receiving elements;

a plurality of scanning means;

each of said scanning means including a laser beam to scan simultaneously a different one of said light receiving elements;

electronic control means for electronically changing the lengths of a plurality of write lines scanned on at least one of said light receiving elements during printing operation to make the write lines on all of said light receiving elements substantially equal when the lengths of the write lines produced by each of said scanning means are not substantially equal;

said electronic control means including:
a clock operating at a fixed frequency to produce equal clock timing pulses of the same frequency for supply to each of said scanning means;

separate selective changing means for electronically selectively changing the number of clock timing pulses for selected PELs in the write line on at least one of said light receiving elements to make the lengths of the write lines on all of said light receiving elements substantially equal;

and periodically determining means for periodically determining the length of each of the write lines;

each of said separate selective changing means including means for changing the number of clock timing pulses for the selected PELs for the write line on at least one of said light receiving elements to change the length of the write line on said at least one light receiving element to make the lengths of the write lines substantially equal;

separate beam sensing means for each of said laser beams and equal in number to the number of said laser beams;

each of said separate beam sensing means including:
two sensing means spaced a predetermined distance apart to provide a measuring line therebetween;
and said two sensing means being passed over by one of said laser beams;

said periodically determining means including measuring means for measuring the number of clock timing pulses required for each of said laser beams to move between said two sensing means of one of said separate beam sensing means to obtain the length of the measuring line relative to the lengths of the measuring lines on the other of said light receiving elements;

and means for utilizing the product of a stored value of a ratio of the length of the write line to the length of the measuring line and the number of clock timing pulses measured by said measuring means to change the length of at least one of the write lines on said at least one light receiving element to make the lengths of the write lines substantially equal on all of said light receiving elements.

38. The laser printer according to claim 37 including ratio determining means for determining the ratio of the length of the write line to the length of the measuring line to provide the stored value of the ratio of the length of the write line to the length of the measuring line.

39. The laser printer according to claim 38 in which said ratio determining means includes:

length determining means for determining the lengths of the write line and the measuring line for each of said light receiving elements at an initial frequency of the clock;

means for adjusting the frequency of the clock to the selected fixed frequency to have the length of one of the write lines substantially equal to a predetermined length;

and determining means for determining the lengths of the write line and the measuring line for each of said light receiving elements at the adjusted frequency of the clock so that the ratio of the length of the write line to the length of the measuring line on each of said light receiving elements is determined.

40. It The laser printer according to claim 39 in which each of said light receiving elements is an electrophotographic photoconductive drum.

41. A laser printer including:

a plurality of light receiving elements;

a plurality of scanning means;

each of said scanning means including a laser beam to scan simultaneously a different one of said light receiving elements;

electronic control means for electronically changing the lengths of a plurality of write lines scanned on at least one of said light receiving elements during printing operation to make the write lines on all of said light receiving elements substantially equal when the lengths of the write lines produced by each of said scanning means are not substantially equal;

said electronic control means including:

a clock operating at a fixed frequency to produce equal clock timing pulses of the same frequency for supply to each of said scanning means;

separate selective changing means for electronically selectively changing the number of clock timing pulses for selected PELs in the write line on at least one of said light receiving elements to make the lengths of the write lines on all of said light receiving elements substantially equal;

and periodically determining means for periodically determining the length of each of the write lines;

each of said separate selective changing means including means for changing the number of clock timing pulses for the selected PELs for the write line on at least one of said light receiving elements to change the length of the write line on said at least one light receiving element to make the lengths of the write lines substantially equal;

offset producing means for producing an offset at locations in each of the write lines on each of said light receiving elements at which the number of the clock timing pulses for each of the selected PELs is changed;

and said offset producing means including means for producing a constant offset for each of the write lines on each of said light receiving elements but beginning the first offset for each of the write lines at a different PEL than adjacent write lines.

42. A laser printer including:

at least one photoconductor;

at least one scanning means including a laser beam to scan a plurality of write lines on said at least one photoconductor;

electronic control means for electronically controlling during printing operation a length of the write lines scanned on said at least one photoconductor so that at least two of the lengths of the write lines produced by said at least one scanning means are maintained substantially constant;

and said electronic control means including:

means for periodically determining the lengths of the at least two of the lengths of the write lines on said at least one photoconductor during printing operation;

and changing means for periodically changing the length of one of the two write lines in accordance with the length of the other of the two write lines during printing operation.

43. A method for controlling the length of a write line on each of a plurality of light receiving elements produced by a different laser beam simultaneously scanning each of the light receiving elements of printheads in a color laser printer to maintain substantially equal lengths of the write lines produced on the light receiving elements by the laser beams during printing operation including: periodically determining the length of the write line on each of the light receiving elements by determining the number of PELslice clock timing pulses of a PELslice clock comprising the length of each of the write lines on each of the light receiving elements during printing operation; and changing the length of the write line on at least one of the light receiving elements so that the lengths of the write lines on all of the light receiving elements are substantially equal by changing the number of the PELslice clock timing pulses for the write line on the at least one light receiving element so that the lengths of the write lines on all of the light receiving elements are substantially equal.

44. The method according to claim 43 including:

periodically determining the number of the PELslice clock timing pulses comprising the length of a separate measuring line on the printhead for each of the light receiving elements by the laser beam scanning the measuring line;

using the product of a previously determined ratio of the length of the write line on each of the light receiving elements to the length of the corresponding measuring line for use with the same light receiving element and the periodically determined number of the PELslice clock timing pulses for the same light receiving element to determine the number of the PELslice clock timing pulses correlated to the actual length of the write line on the same light receiving element;

and changing the number of the PELslice clock timing pulses for the write lines on at least one of the light receiving elements so that the write lines on all of the light receiving elements are substantially equal.

45. A method for controlling the length of a write line on each of a plurality of light receiving elements produced by a different laser beam simultaneously scanning each of the light receiving elements of printheads in a color laser printer to maintain substantially equal lengths of the write lines, produced on the light receiving elements by the laser beams including:

selecting a fixed frequency of a clock producing equal clock timing pulses for each of the laser beams so that the write lines on each of the light receiving elements are substantially equal;

determining a ratio of the length of the write line on each of the light receiving elements to the length of a measuring line on the same light receiving element at the selected fixed frequency of the clock producing equal clock timing pulses for each of the laser beams so that the lengths of the write lines on all of the light receiving elements are substantially equal;

periodically determining the length of each of the measuring lines by the number of clock timing pulses produced for each of the laser beams during scanning of the write line on each of the light receiving elements by its corresponding laser beam;

using the product of the ratio of the length of the write line on each of the light receiving elements to the length of the measuring line on the same light receiving element for each of the light receiving elements and the periodically determined number of clock timing pulses during scanning of each of the light receiving elements by its corresponding laser beam to ascertain if the length of the write line on at least one of the light receiving elements has changed and the amount of change;

and changing the selected number of the clock timing pulses without changing the selected fixed frequency of the clock at selected PELs for each of the laser beams having the length of a write line not substantially equal to a selected value to change the length of each of the write lines not substantially equal to the selected value so that the lengths of the write lines on all of the light receiving elements are substantially equal.

46. The method according to claim 45 in which the ratio of the length of the write line on each of the light receiving elements to the length of the measuring line on the same light receiving element is determined through:

initially determining the lengths of the write line and the measuring line on each of the light receiving elements at an initial frequency of the clock producing the equal clock timing pulses;

adjusting the frequency of the clock to the selected fixed frequency so that the length of the write line on at least one of the light receiving elements is substantially equal to the selected value;

measuring the lengths of the write line and the measuring line on each of the light receiving elements at the selected fixed frequency of the clock;

and determining the ratio of the length of the write line on each of the light receiving elements to the length of the measuring line on the same light receiving element at the selected fixed frequency of the clock.

47. A method for controlling the length of a write line on a light receiving element produced by a laser beam scanning the light receiving element in a laser printer to maintain the lengths of the write lines produced on the light receiving element by the laser beam substantially constant including:

selecting a fixed frequency of a clock producing equal clock timing pulses for the laser beam so that the write line has a desired length;

determining a ratio of the length of the write line on the light receiving element to the length of a measuring line at the selected fixed frequency of the clock producing equal clock timing pulses for the laser beam so that the write line has a desired length;

periodically determining the length of the measuring line by the number of clock timing pulses produced during scanning of the measuring line on the light receiving element by the laser beam;

using the product of the ratio of the length of the write line on the light receiving element to the length of the measuring line on the light receiving element and the periodically determined number of clock timing pulses during scanning of the light receiving element by the laser beam to ascertain if the length of the write line has changed and the amount of change;

and changing the selected number of the clock timing pulses for the write line without changing the selected fixed frequency of the clock at selected PELs along the write line to change the length of the write line to the desired length if the length of the write line has changed.

48. The method according to claim 47 in which the ratio of the length of the write line on the light receiving element to the length of the measuring line on the light receiving element is determined through:

initially determining the lengths of the write line and the measuring line at an initial frequency of the clock producing the equal clock timing pulses;

adjusting the frequency of the clock to the selected fixed frequency so that the length of the write line is substantially equal to the desired length of the write line;

measuring the lengths of the write line and the measuring line at the selected fixed frequency of the clock;

and determining the ratio of the length of the write line on the light receiving element to the length of the measuring line on the light receiving element at the selected fixed frequency of the clock.

\* \* \* \* \*